(12) United States Patent
Yang

(10) Patent No.: US 12,484,043 B2
(45) Date of Patent: Nov. 25, 2025

(54) FEEDBACK RESOURCE DETERMINING METHOD AND APPARATUS

(71) Applicant: HUAWEI TECHNOLOGIES CO., LTD., Shenzhen (CN)

(72) Inventor: Fan Yang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 445 days.

(21) Appl. No.: 17/891,245

(22) Filed: Aug. 19, 2022

(65) Prior Publication Data

US 2022/0394738 A1    Dec. 8, 2022

Related U.S. Application Data

(63) Continuation of application No. PCT/CN2020/076499, filed on Feb. 24, 2020.

(51) Int. Cl.
*H04W 72/1263*  (2023.01)
*H04L 1/1812*  (2023.01)
*H04W 92/18*  (2009.01)

(52) U.S. Cl.
CPC ....... *H04W 72/1263* (2013.01); *H04L 1/1812* (2013.01); *H04W 92/18* (2013.01)

(58) Field of Classification Search
CPC .. H04W 72/1263; H04W 92/18; H04L 1/1812
See application file for complete search history.

(56) References Cited

U.S. PATENT DOCUMENTS

| 2020/0029318 | A1 | 1/2020 | Guo |
| 2021/0227604 | A1* | 7/2021 | Huang ............. H04W 40/248 |
| 2023/0019024 | A1* | 1/2023 | Stare ............. H04W 72/30 |

FOREIGN PATENT DOCUMENTS

| CN | 110445586 A | 11/2019 |
| CN | 110536445 A | 12/2019 |
| WO | 2019128418 A1 | 7/2019 |

OTHER PUBLICATIONS

Apple, Remaining Details on Physical Layer Procedures for NR V2X Sidelink[online], 3GPP TSG RAN WG1 #100_eR1-2000853, Internet URL:https://www.3gpp.org/ftp/tsg_ran/WG1_RL1/TSGR1_100_e/Docs/R1-2000853.zip>, total:6pages.
Japanese Office Action issued in corresponding Japanese Application No. 2022-550202, dated Sep. 5, 2023, pp. 1-3.
(Continued)

*Primary Examiner* — Rhonda L Murphy
(74) *Attorney, Agent, or Firm* — HAUPTMAN HAM, LLP

(57) ABSTRACT

A feedback resource determining method and apparatus is applied to systems such as an internet of vehicles, V2X, and V2V. The method includes obtaining a first parameter, where the first parameter is related to a cast type and a hybrid automatic repeat request HARQ feedback manner, the cast type includes unicast and multicast, and the HARQ feedback manner corresponds to the cast type; and determining a physical sidelink feedback channel PSFCH based on the first parameter. According to the feedback resource determining method and apparatus provided, PSFCHs of different sizes are allocated for different cast types and HARQ feedback manners. This improves resource utilization.

20 Claims, 8 Drawing Sheets

(56) References Cited

OTHER PUBLICATIONS

R2-1915131, Lenovo, Motorola Mobility et al., Remaining issue for SL-BSR, 3GPP TSG-RAN WG2 Meeting #108, Reno, Nevada, USA, Nov. 18-22, 2019, 3 pages.
R1-1912814, Apple, Physical Layer Procedures for NR V2X Sidelink, 3GPP TSG RAN WG1 #99, Reno, USA, Nov. 18-22, 2019, 6 pages.
3GPP TS 38.211 V16.0.0 (Dec. 2019), 3rd Generation Partnership Project; Technical Specification Group Radio Access Network;NR;Physical channels and modulation(Release 16), 129 pages.
3GPP TS 38.212 V16.0.0 (Dec. 2019), 3rd Generation Partnership Project; Technical Specification Group Radio Access Network;NR;Multiplexing and channel coding(Release 16), 145 pages.
International Search Report issued in corresponding International Application No. PCT/CN2020/076499, dated Oct. 21, 2020, pp. 1-12.
Extended European Search Report issued in corresponding European Application No. 20922240.5, dated Jan. 25, 2023, pp. 1-7.

* cited by examiner

FEEDBACK RESOURCE DETERMINING METHOD AND APPARATUS

CROSS-REFERENCE TO RELATED APPLICATIONS

This application is a continuation of International Application No. PCT/CN2020/076499, filed on Feb. 24, 2020, the disclosure of which is hereby incorporated in entirety by reference.

BACKGROUND

A hybrid automatic repeat request (hybrid automatic repeat request, HARQ) is a technology formed by combing forward error correction (forward error correction, FEC) encoding and automatic repeat request (automatic repeat request, ARQ).

In a conventional technology, for a unicast manner in a vehicle to everything (vehicle to everything, V2X) scenario, a receiving terminal feeds back HARQ information on one feedback resource. For a multicast manner, a sending terminal sends a physical sidelink shared channel (physical sidelink shared channel, PSSCH), and then another receiving terminal in a same group feeds back HARQ information to the sending terminal. In a multicast feedback manner 1 (option 1), when receiving fails, receiving terminals in the group feed back negative acknowledgments (negative acknowledgements, NACKs) on a same feedback resource. If receiving succeeds, an acknowledgment (acknowledgement, ACK) is not fed back. In a multicast feedback manner 2 (option 2), the receiving terminal in the group needs to feed back a NACK or an ACK on a plurality of feedback resources. The feedback resource is associated with a PSSCH resource and identification information of a terminal.

For unicast and multicast, the receiving terminal feeds back a HARQ to the sending terminal in different manners. As a result, the foregoing resource allocation manner causes low resource utilization.

SUMMARY

Some embodiments provide a feedback resource determining method and apparatus. The feedback resource determining method and apparatus is applied to an internet of vehicles, for example, vehicle to everything (vehicle to everything, V2X) communication, long term evolution-vehicle (long term evolution-vehicle, LTE-V) communication, vehicle to vehicle (vehicle to vehicle, V2V) communication, or the like, or is applied to fields such as intelligent driving and intelligent connected vehicles.

In some embodiments, a first parameter is obtained, and a PSFCH is determined based on the first parameter. The first parameter is related to a cast type and a HARQ feedback manner. The cast type includes unicast and multicast. The HARQ feedback manner corresponds to the cast type. A first terminal device determines the PSFCH based on the first parameter that is related to the cast type and the HARQ feedback manner, so that PSFCHs of different sizes are allocated for different cast types and HARQ feedback manners. This improves resource utilization.

According to a first aspect, some embodiments provide a feedback resource determining method, applied to a first terminal device. The method includes:
obtaining a first parameter, where the first parameter is related to a cast type and a hybrid automatic repeat request HARQ feedback manner, the cast type includes unicast and multicast, and the HARQ feedback manner corresponds to the cast type; and
determining a physical sidelink feedback channel PSFCH based on the first parameter.

In some embodiments, the first terminal device determines the PSFCH based on the first parameter that is related to the cast type and the HARQ feedback manner, so that PSFCHs of different sizes are allocated for different cast types and HARQ feedback manners. This improves resource utilization.

In some embodiments, the method further includes:
sending the first parameter to a second terminal device.

In some embodiments, the first terminal device sends the first parameter to the second terminal device, so that the second terminal device further determines allocated PSFCHs of different sizes for different cast types and HARQ feedback manners. This improves resource utilization.

In some embodiments, the method further includes:
receiving the PSFCH sent by the second terminal device.

In some embodiments, the first parameter is further related to a quantity of bits of a HARQ carried on the PSFCH.

In some embodiments, different PSFCHs determined vary with different quantities of bits of HARQs carried on the PSFCHs. This ensures HARQ transmission performance, and improve resource utilization.

In some embodiments, the HARQ feedback manner includes a first manner and a second manner. The PSFCH includes a first PSFCH and a second PSFCH. The first PSFCH is used to transmit HARQ information of unicast information and HARQ information fed back in the first manner. The second PSFCH is used to transmit HARQ information fed back in the second manner.

In some embodiments, the PSFCH includes two parts: one part is used to transmit the HARQ information of the unicast information and the HARQ information fed back in the first manner, and the other part is used to transmit the HARQ information fed back in the second manner. This improves resource utilization.

According to a second aspect, some embodiments provide a feedback resource determining method, including:
determining a quantity X of physical sidelink shared channel PSSCH transmissions based on a quantity of subchannels and a quantity of slots corresponding to a PSFCH; and
determining a quantity of available RBs for a PSFCH based on the quantity X of PSSCH transmissions, where the quantity of available RBs for the PSFCH is an integer; and
a quantity of available resource blocks RBs for a PSFCH corresponding to each of first T PSSCH transmissions is at least one more than a quantity of available RBs for a PSFCH corresponding to each of X-T PSSCH transmissions, T is a positive integer, and X is a positive integer greater than T.

In some embodiments, the quantity of available resource blocks RBs for the PSFCH is determined based on a quantity M of PSSCH transmissions, and the quantity of available resource blocks RBs for the PSFCH corresponding to each of the first T PSSCH transmissions is at least one more than a quantity of available RBs for a PSFCH corresponding to each of M-T PSSCH transmissions, to ensure that the quantity of available RBs allocated to the PSFCH corresponding to each PSSCH transmission is an integer. This optimizes resource allocation, and improve resource utilization.

According to a third aspect, some embodiments provide a feedback resource determining method, applied to a first terminal device. The method includes:

obtaining first information; and determining, based on the first information, a quantity of physical sidelink feedback channels PSFCHs sent on a same time domain resource.

In some embodiments, the first information is obtained, and the quantity of PSFCHs sent on the same time domain resource is determined based on the first information, so that the quantity of PSFCHs that is sent on the same time domain resource is determined based on the first information. Therefore, this ensures that transmission of a terminal device does not exceed maximum power, and improve PSFCH transmission performance.

In some embodiments, the first information is higher layer indication information and/or dynamic indication information.

In some embodiments, the quantity of PSFCHs sent on the same time domain resource is determined based on the higher layer indication information and/or the dynamic indication information, so that determining the quantity of PSFCHs is relatively simple.

In some embodiments, the first information includes transmit power of the first terminal device and/or a minimum communication distance between the first terminal device and a second terminal device.

In some embodiments, the quantity of PSFCHs sent on the same time domain resource is determined based on the minimum communication distance between the first terminal device and the second terminal device, so that determining the quantity of PSFCHs is relatively simple.

In addition, the quantity of PSFCHs sent on the same time domain resource is determined based on the transmit power of the first terminal device, so that the transmit power of the first terminal device does not exceed the maximum transmit power. This improves PSFCH transmission performance.

According to a fourth aspect, some embodiments provide a feedback resource determining method, applied to a second terminal device. The method includes:

receiving a first parameter from a first terminal device, where the first parameter is related to a cast type and a hybrid automatic repeat request HARQ feedback manner, the cast type includes unicast and multicast, and the HARQ feedback manner corresponds to the cast type; and determining a physical sidelink feedback channel PSFCH based on the first parameter.

In some embodiments, the first terminal device sends the first parameter to the second terminal device, so that the second terminal device further determines allocated PSFCHs of different sizes for different cast types and HARQ feedback manners. This improves resource utilization.

In some embodiments, the method further includes:
sending the PSFCH to the first terminal device.

In some embodiments, the first parameter is further related to a quantity of bits of a HARQ carried on the PSFCH.

In some embodiments, different PSFCHs determined vary with different quantities of bits of HARQs carried on the PSFCHs. This ensures HARQ transmission performance, and improve resource utilization.

In some embodiments, the HARQ feedback manner includes a first manner and a second manner. The PSFCH includes a first PSFCH and a second PSFCH. The first PSFCH is used to transmit HARQ information of unicast information and HARQ information fed back in the first manner. The second PSFCH is used to transmit HARQ information fed back in the second manner.

In some embodiments, the PSFCH includes two parts: one part is used to transmit the HARQ information of the unicast information and the HARQ information fed back in the first manner, and the other part is used to transmit the HARQ information fed back in the second manner. This improves resource utilization.

According to a fifth aspect, some embodiments provide a feedback resource determining method, applied to a network device. The method includes:

sending a first parameter to a first terminal device, where the first parameter is related to a cast type and a hybrid automatic repeat request HARQ feedback manner, the cast type includes unicast and multicast, the HARQ feedback manner corresponds to the cast type, and the first parameter indicates that the first terminal device determines a PSFCH.

In some embodiments, the network device directly sends the first parameter to the first terminal device, so that the first terminal device determines the PSFCH based on the first parameter. In this way, obtaining the first parameter is relatively simple.

According to a sixth aspect, some embodiments provide a feedback resource determining method, applied to a network device. The method includes:

sending first information to a first terminal device, where the first information indicates that the first terminal device determines a quantity of physical sidelink feedback channels PSFCHs sent on a same time domain resource.

In some embodiments, the network device directly sends the first information to the first terminal device, so that the first terminal device determines, based on the first information, the quantity of physical sidelink feedback channels PSFCHs sent on the same time domain resource. In this way, obtaining the first information is relatively simple.

According to a seventh aspect, some embodiments provide a feedback resource determining apparatus, including:

a processing unit, configured to obtain a first parameter, where the first parameter is related to a cast type and a hybrid automatic repeat request HARQ feedback manner, the cast type includes unicast and multicast, and the HARQ feedback manner corresponds to the cast type.

The processing unit is further configured to determine a physical sidelink feedback channel PSFCH based on the first parameter.

In some embodiments, the apparatus further includes:
a sending unit, configured to send the first parameter to a second terminal device.

In some embodiments, the apparatus further includes:
a receiving unit, configured to receive the PSFCH sent by the second terminal device.

In some embodiments, the first parameter is further related to a quantity of bits of a HARQ carried on the PSFCH.

In some embodiments, the HARQ feedback manner includes a first manner and a second manner. The PSFCH includes a first PSFCH and a second PSFCH. The first PSFCH is used to transmit HARQ information of unicast information and HARQ information fed back in the first manner. The second PSFCH is used to transmit HARQ information fed back in the second manner.

According to an eighth aspect, some embodiments provide a feedback resource determining apparatus, including:

a processing unit, configured to determine a quantity X of physical sidelink shared channel PSSCH transmissions based on a quantity of subchannels and a quantity of slots corresponding to a PSFCH.

The processing unit is further configured to determine a quantity of available RBs for a PSFCH based on the quantity X of PSSCH transmissions. The quantity of available RBs for the PSFCH is an integer.

a quantity of available resource blocks RBs for a PSFCH corresponding to each of first T PSSCH transmissions is at least one more than a quantity of available RBs for a PSFCH corresponding to each of X-T PSSCH transmissions, T is a positive integer, and X is a positive integer greater than T.

According to a ninth aspect, some embodiments provide a feedback resource determining apparatus, including:

a processing unit, configured to obtain first information.

The processing unit is further configured to determine, based on the first information, a quantity of physical sidelink feedback channels PSFCHs sent on a same time domain resource.

In some embodiments, the first information is higher layer indication information and/or dynamic indication information.

In some embodiments, the first information includes transmit power of a first terminal device and/or a minimum communication distance between the first terminal device and a second terminal device.

According to a tenth aspect, some embodiments provide a feedback resource determining apparatus, including:

a receiving unit, configured to receive a first parameter from a first terminal device, where the first parameter is related to a cast type and a hybrid automatic repeat request HARQ feedback manner, the cast type includes unicast and multicast, and the HARQ feedback manner corresponds to the cast type; and a processing unit, configured to determine a physical sidelink feedback channel PSFCH based on the first parameter.

In some embodiments, the apparatus further includes:

a sending unit, configured to send the PSFCH to the first terminal device.

In some embodiments, the first parameter is further related to a quantity of bits of a HARQ carried on the PSFCH.

In some embodiments, the HARQ feedback manner includes a first manner and a second manner. The PSFCH includes a first PSFCH and a second PSFCH. The first PSFCH is used to transmit HARQ information of unicast information and HARQ information fed back in the first manner. The second PSFCH is used to transmit HARQ information fed back in the second manner.

According to an eleventh aspect, some embodiments provide a feedback resource determining apparatus, including:

a sending unit, configured to send a first parameter to a first terminal device, where the first parameter is related to a cast type and a hybrid automatic repeat request HARQ feedback manner, the cast type includes unicast and multicast, the HARQ feedback manner corresponds to the cast type, and the first parameter indicates that the first terminal device determines a PSFCH.

According to a twelfth aspect, some embodiments provide a feedback resource determining apparatus, including:

a sending unit, configured to send first information to a first terminal device, where the first information indicates that the first terminal device determines a quantity of physical sidelink feedback channels PSFCHs sent on a same time domain resource.

According to a thirteenth aspect, some embodiments provide a communication apparatus. The apparatus includes a processor and a memory. The memory stores a computer program. The processor executes the computer program stored in the memory, to enable the apparatus to perform the method in any one of the first aspect to the sixth aspect.

According to a fourteenth aspect, some embodiments provide a communication apparatus, including a processor and an interface circuit.

The interface circuit is configured to receive code instructions and transmit the code instructions to the processor.

The processor is configured to run the code instructions to perform the method in any one of the first aspect to the sixth aspect.

The apparatus mentioned in each of the seventh aspect to the tenth aspect of this application is a terminal device, or is a chip in a terminal device. The terminal device or the chip has a function of implementing the feedback resource determining method in the foregoing aspects or any possible design of the foregoing aspects. The function is implemented by hardware, or is implemented by hardware executing corresponding software. The hardware or the software includes one or more units corresponding to the foregoing function.

The terminal device includes a processing unit and a transceiver unit. The processing unit is a processor. The transceiver unit is a transceiver. The transceiver includes a radio frequency circuit. Optionally, the terminal device further includes a storage unit, and the storage unit is, for example, a memory. When the terminal device includes the storage unit, the storage unit is configured to store computer-executable instructions. The processing unit is connected to the storage unit, and the processing unit executes the computer-executable instructions stored in the storage unit, so that the terminal device performs the feedback resource determining method in the foregoing aspects or any possible design of the foregoing aspects.

The chip includes a processing unit and a transceiver unit. The processing unit is a processor. The transceiver unit is an input/output interface, a pin, a circuit, or the like on the chip. The processing unit executes the computer-executable instructions stored in the storage unit, so that the chip performs the feedback resource determining method in the foregoing aspects or any possible design of the foregoing aspects. Optionally, the storage unit is a storage unit (for example, a register or a buffer) in the chip, or the storage unit is a storage unit (for example, a read-only memory (read-only memory, ROM)) that is located outside the chip in the terminal device, another type of static storage device (for example, a random access memory (random access memory, RAM)) that stores static information and instructions, or the like.

The processor mentioned above is a central processing unit (central processing unit, CPU), a microprocessor, or an application-specific integrated circuit (application specific integrated circuit, ASIC), or is one or more integrated circuits that are configured to control program execution of the feedback resource determining method in the foregoing aspects or any possible design of the foregoing aspects.

The apparatus mentioned in each of the eleventh aspect to the twelfth aspect of this application is a network device, or is a chip in a network device. The network device or the chip has a function of implementing the feedback resource determining method in the foregoing aspects or any possible design of the foregoing aspects. The function is implemented by hardware, or is implemented by hardware executing corresponding software. The hardware or the software includes one or more units corresponding to the foregoing function.

The network device includes a processing unit and a transceiver unit. The processing unit is a processor. The transceiver unit is a transceiver. The transceiver includes a radio frequency circuit. Optionally, the network device further includes a storage unit, and the storage unit is, for example, a memory. When the network device includes the storage unit, the storage unit is configured to store computer-executable instructions. The processing unit is connected to the storage unit, and the processing unit executes the computer-executable instructions stored in the storage unit, so that the network device performs the feedback resource determining method in the foregoing aspects or any possible design of the foregoing aspects.

The chip includes a processing unit and a transceiver unit. The processing unit is a processor. The transceiver unit is an input/output interface, a pin, a circuit, or the like on the chip. The processing unit executes the computer-executable instructions stored in the storage unit, so that the chip performs the feedback resource determining method in the foregoing aspects or any possible design of the foregoing aspects. Optionally, the storage unit is a storage unit (for example, a register or a buffer) in the chip, or the storage unit is a storage unit (for example, a read-only memory (read-only memory, ROM)) that is located outside the chip in the terminal device, another type of static storage device (for example, a random access memory (random access memory, RAM)) that stores static information and instructions, or the like.

The processor mentioned above is a central processing unit (central processing unit, CPU), a microprocessor, or an application-specific integrated circuit (application specific integrated circuit, ASIC), or is one or more integrated circuits that are configured to control program execution of the feedback resource determining method in the foregoing aspects or any possible design of the foregoing aspects.

According to a fifteenth aspect, some embodiments provide a communication system, including the first terminal device in the seventh aspect to the ninth aspect, the second terminal device in the tenth aspect, and the network device in the eleventh aspect to the twelfth aspect.

According to a sixteenth aspect, some embodiments provide a readable storage medium, configured to store instructions. When the instructions are executed, the method in any one of the first aspect to the sixth aspect is implemented.

According to a seventeenth aspect, some embodiments provide a computer program product including instructions. When the computer program product runs on a computer, the computer is enabled to perform the feedback resource determining method provided in any one of the first aspect to the sixth aspect in some embodiments.

An eighteenth aspect in some embodiments provides a communication apparatus, including a memory, a processor, and a computer program. The computer program is stored in the memory and is configured to be executed by the processor. The computer program includes instructions used to perform the method in any one of the first aspect to the sixth aspect.

According to the feedback resource determining method and apparatus provided in some embodiments, the first terminal device obtains the first parameter, and determines the PSFCH based on the first parameter. The first parameter is related to the cast type and the HARQ feedback manner. The cast type includes the unicast and the multicast. The HARQ feedback manner corresponds to the cast type. The first terminal device determines the PSFCH based on the first parameter that is related to the cast type and the HARQ feedback manner, so that PSFCHs of different sizes is allocated for different cast types and HARQ feedback manners. This improves resource utilization.

DESCRIPTION OF EMBODIMENTS

The following explains and describes some terms in some embodiments, to facilitate understanding by a person skilled in the art.

(1) A unit in some embodiments is a functional unit or a logic unit. The unit is in a form of software, and a function of the unit is implemented by a processor by executing program code. Alternatively, the unit is in a form of hardware.

(2) The term "a plurality of" means two or more. Other quantifiers have similar interpretations. The term "and/or" describes an association relationship between associated objects and indicates that three relationships exists. For example, A and/or B indicates the following three cases: A exists, both A and B exist, and B exists. The character "/" generally indicates an "or" relationship between the associated objects. A range described by using "above", "below", or the like includes boundary points.

In some embodiments, the first terminal device is a device having a sending capability, and the second terminal device is a device having a receiving capability. In addition, the first terminal device alternatively is a device having a receiving capability, and the second terminal device is a device having a sending capability.

For clear and brief description of the following embodiments, a related technology is briefly described first.

Figure 1:
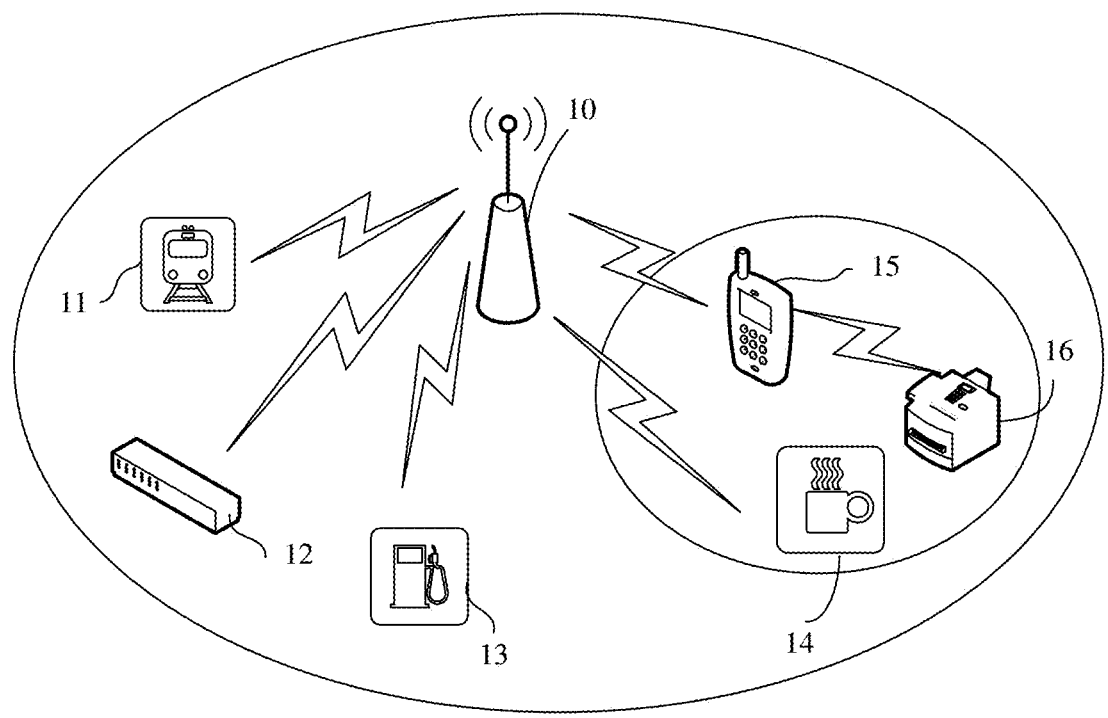
FIG. 1 is a schematic diagram of a structure of a communication system according to some embodiments.

A feedback resource determining method provided in some embodiments is applicable to a communication system. FIG. 1 is a schematic diagram of a structure of a communication system according to some embodiments. As shown in FIG. 1, the communication system includes at least one network device 10 and at least one terminal device located within coverage of the network device 10. The terminal device is located at a fixed position, or is mobile. FIG. 1 is a schematic diagram. The communication system further includes another device, for example, further includes a core network device (not shown in FIG. 1). The network device is connected to the core network device in a wireless or wired manner. The core network device and the network device is different physical devices independent of each other, or functions of the core network device and logical functions of the network device is integrated into a same physical device, or some of functions of the core network device and some of functions of the network device is integrated into one physical device. In addition, the communication system further includes another network device, for example, further includes a wireless relay device and a wireless backhaul device, which are not shown in FIG. 1. Quantities of core network devices, network devices, and terminal devices included in the communication system are not limited in some embodiments.

As shown in FIG. 1, communication between the network device 10 and the terminal device is described. The network device 10 serves as a sender, and sends downlink information to one or more terminal devices in the terminal device 11 to the terminal device 16. Correspondingly, the terminal device 11 to the terminal device 15 that directly communicates with the network device 10 separately or simultaneously sends the uplink information to the network device 10.

The network device is an entity used to transmit or receive a signal on a network side, for example, a generation NodeB (generation NodeB, gNodeB). The network device is a device configured to communicate with a mobile device. The network device is an AP in a wireless local area network (wireless local area network, WLAN), a base transceiver station (base transceiver station, BTS) in a global system for mobile communication (global system for mobile communication, GSM) or code division multiple access (Code Division Multiple Access, CDMA), a NodeB (NodeB, NB) in wideband code division multiple access (Wideband Code Division Multiple Access, WCDMA), an evolved NodeB (evolutional NodeB, eNB or eNodeB) in long term evolution (Long Term Evolution, LTE), a relay station, an access point, a vehicle-mounted device, a wearable device, a network device in a future 5G network, a network device in a future evolved public land mobile network (public land mobile network, PLMN), a gNodeB in an NR system, or the like. In addition, in some embodiments, the network device serves a cell, and the terminal device communicates with the network device by using a transmission resource (for example, a frequency domain resource, namely, a spectrum resource) used by the cell. The cell is a cell corresponding to the network device (for example, a base station). The cell belongs to a macro base station, or belongs to a base station corresponding to a small cell (small cell). The small cell herein includes a metro cell (metro cell), a micro cell (micro cell), a pico cell (pico cell), a femto cell (femto cell), and the like. These small cells have features of small coverage and low transmit power and are applicable to providing a high-rate data transmission service. In addition, in another possible case, the network device is another apparatus that provides a wireless communication function for the terminal device. A technology and a device form that are used by the network device are not limited in some embodiments. For ease of description, in some embodiments, an apparatus that provides a wireless communication function for a terminal device is referred to as a network device.

The terminal device is a terminal device (for example, an in-vehicle terminal device, or a terminal device carried by a user taking a vehicle) located on a vehicle in V2X, a terminal device located on X (X is a vehicle, an infrastructure, a network, a pedestrian, and the like), or the vehicle terminal or the X. The terminal device herein is a wireless terminal device that receives scheduling and indication information of the network device. The wireless terminal device is a device that provides a user with voice and/or data connectivity, a handheld device with a wireless connection function, or another processing device connected to a wireless modem. The wireless terminal device communicates with one or more core networks or the Internet through a radio access network (such as a radio access network, RAN). The wireless terminal device is a mobile terminal device, for example a mobile phone (further referred to as a "cellular" phone or a mobile phone (mobile phone)), a computer, and a data card. For example, the wireless terminal device is a portable, pocket-sized, handheld, computer built-in, or vehicle-mounted mobile apparatus that exchanges language and/or data with the radio access network. For example, the terminal device is a device such as a personal communication service (personal communication service, PCS) phone, a cordless phone, a session initiation protocol (session initiation protocol, SIP) phone, a wireless local loop (wireless local loop, WLL) station, a personal digital assistant (personal digital assistant, PDA), a tablet computer (Pad), or a computer with a wireless transceiver function. The wireless terminal device alternatively is referred to as a system, a subscriber unit (subscriber unit), a subscriber station (subscriber station), a mobile station (mobile station), a mobile station (mobile station, MS), a remote station (remote station), an access point (access point, AP), a remote terminal (remote terminal) device, an access terminal (access terminal) device, a user terminal (user terminal) device, a user agent (user agent), a subscriber station (subscriber station, SS), customer premises equipment (customer premises equipment, CPE), a terminal (terminal), user equipment (user equipment, UE), a mobile terminal (mobile terminal, MT), or the like. Alternatively, the wireless terminal device is a wearable device and a next-generation communication system, for example, a terminal device in a 5G network, a terminal device in a future evolved PLMN network, or a terminal device in a new radio (new radio, NR) communication system.

The network device and the terminal device is deployed on land, including indoor or outdoor and handheld or vehicle-mounted devices, or is deployed on the water, or is deployed on an airplane, a balloon, or a satellite in the air. Scenarios of the network device and the terminal device are not limited in some embodiments.

In the communication system in this embodiment shown in FIG. 1, the terminal device 14 to the terminal device 16 forms a device-to-device communication system. In the device-to-device communication system, the terminal device 15 serves as a sender, and sends information to one or more of the terminal device 14 and the terminal device 16.

Correspondingly, the terminal device 14 and the terminal device 16 separately or simultaneously sends data to the terminal device 15.

The communication system is an LTE system, an LTE Advanced (LTE Advanced, LTE-A) system, or a 5G new radio (new radio, NR) system. Solutions in some embodiments are applied to a V2X communication process, and in particular, applied to a scenario in which a PSFCH needs to be determined. Certainly, the solutions in some embodiments further are applied to another communication system, provided that there is an entity in the communication system that obtains a first parameter and determine a PSFCH based on the first parameter. The first parameter is related to a cast type and a HARQ feedback manner. Another entity further obtains the first parameter, determine the PSFCH based on the first parameter, and optionally send the PSFCH to the entity.

Figure 2:
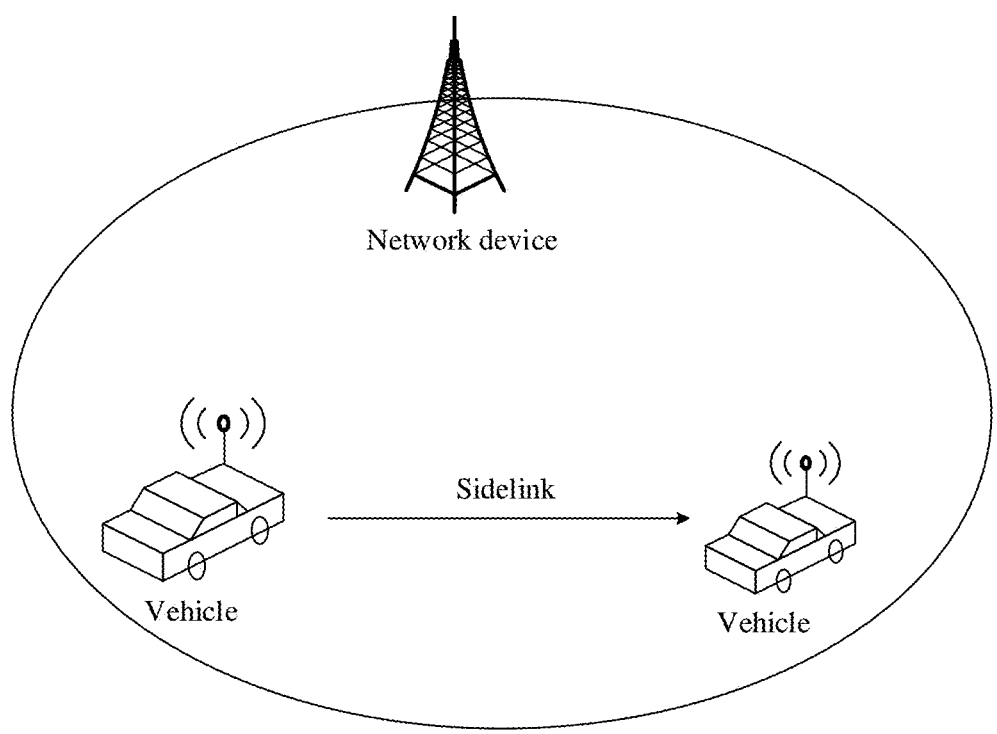
FIG. 2 is a schematic diagram 1 of a V2X communication scenario according to some embodiments.

FIG. 2 is a schematic diagram 1 of a V2X communication scenario according to some embodiments. As shown in FIG. 2, currently the V2X communicates with each other over a sidelink (Sidelink). A vehicle (that is, the terminal device on the vehicle, briefly referred to as a vehicle terminal device) and the X (a terminal device on X) directly communicates with each other by using a resource configured by the network device over the sidelink, for example, signaling exchange in Internet access, calling, and location information notification and the like does not need to be forwarded by the network device. FIG. 2 is a schematic diagram in which the V2V communicates with each other over the sidelink.

Figure 3:
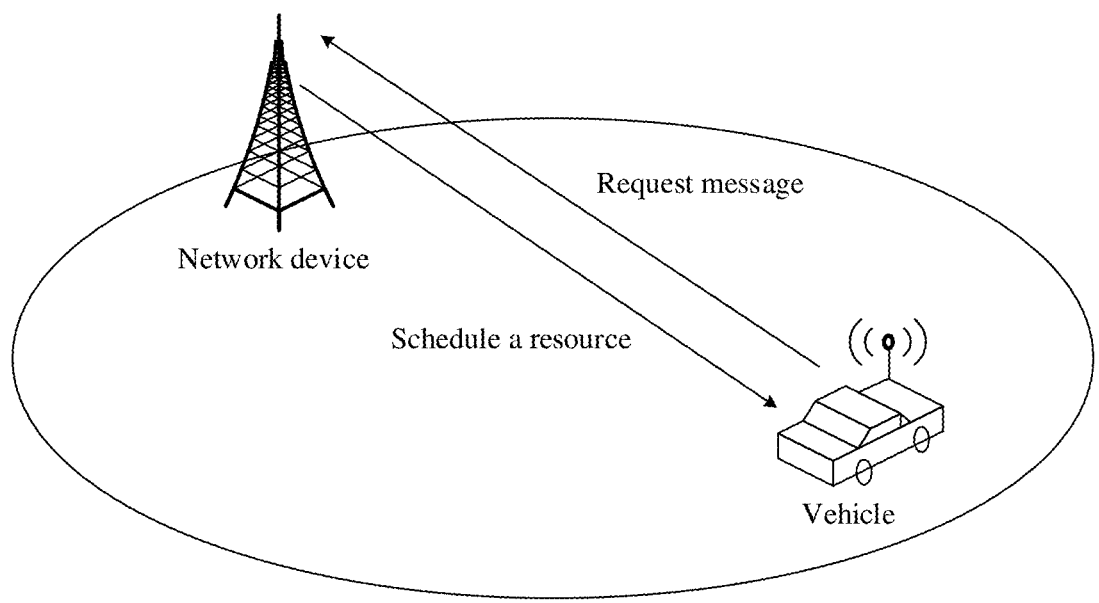
FIG. 3 is a schematic diagram 2 of a V2X communication scenario according to some embodiments.
Figure 4:
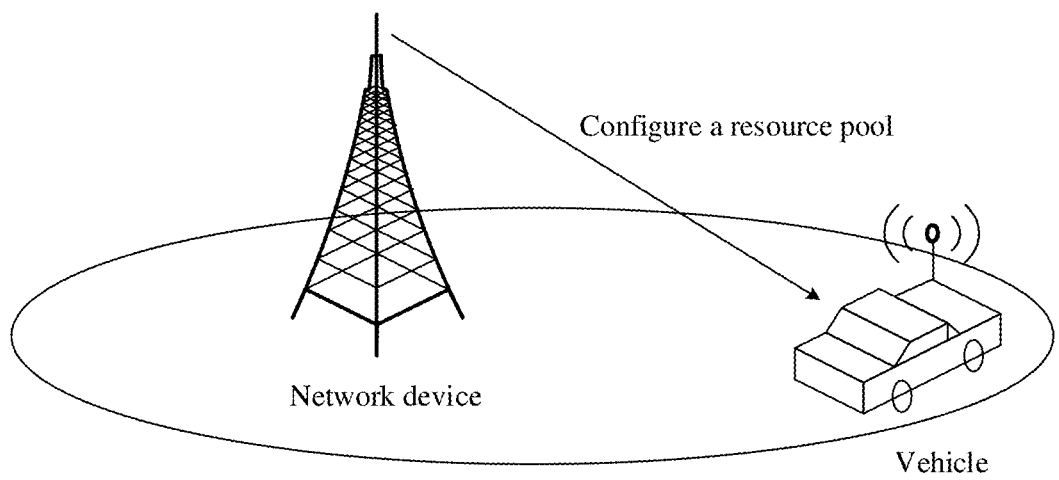
FIG. 4 is a schematic diagram 3 of a V2X communication scenario according to some embodiments.

When the V2X communicates with each other over the sidelink, the communication of the V2X is further classified into two modes: a mode 1 and a mode 2. FIG. 3 is a schematic diagram 2 of a V2X communication scenario according to some embodiments. FIG. 4 is a schematic diagram 3 of a V2X communication scenario according to some embodiments. The vehicles are used as an example. As shown in FIG. 3, when the V2X communicates with each other in the mode 1, the network device dynamically or semi-dynamically schedules a resource for a vehicle terminal device based on a request message sent by the vehicle terminal device. In this way, the vehicle terminal device communicates, by using a resource scheduled by the network device over the sidelink, with the terminal device located on anything (everything), that is, X. As shown in FIG. 4, when the V2X communicates with each other in the mode 2, the network device configures a resource pool or preconfigure a resource pool for a vehicle terminal device based on a system information block (system information block, SIB) message or radio resource control (radio resource control, RRC) signaling. In this way, the vehicle terminal device obtains the resource from the resource pool and communicate with the terminal device located on the X over the sidelink. During implementation, the vehicle terminal device obtains the resource from the resource pool by using a random selection method or a method based on a listening reservation mechanism.

A system architecture and a service scenario described in some embodiments are intended to describe the technical solutions in some embodiments more clearly, and do not constitute any limitation on the technical solutions provided in some embodiments. A person of ordinary skill in the art knows that, with evolution of a network architecture and emergence of a new service scenario, the technical solutions provided in some embodiments are further applicable to a similar technical problem.

The following briefly describes applicable scenarios in some embodiments.

In the V2X scenario, HARQ information of a physical sidelink shared channel (physical sidelink shared channel, PSSCH) is usually transmitted by using a physical sidelink feedback channel (physical sidelink feedback channel, PSFCH). For a unicast type, a receiving terminal feeds back HARQ information on a PSFCH resource. If the receiving terminal fails to receive data, the receiving terminal feeds back a NACK on the PSFCH resource. If the receiving terminal successfully receives data, the receiving terminal feeds back an ACK on the PSFCH resource. For a multicast type, a sending terminal sends a PSSCH, and then another receiving terminal in a same group feeds back HARQ information to the sending terminal. If the HARQ feedback manner is a multicast feedback manner 1 (option 1), if the receiving terminal fails to receive data, receiving terminals in the group feed back NACKs on a same PSFCH resource. If the receiving terminal successfully receives data, the receiving terminal does not feed back an ACK to the sending terminal. If the HARQ feedback manner is a multicast feedback manner 2 (option 2), receiving terminals in the group need to feed back NACKs or ACKs on a plurality of PSFCH resources. Regardless of the unicast type or the multicast type, the PSFCH resource is allocated based on a PSSCH resource and identification information of a terminal. In this way, for the unicast type and the multicast feedback manner 1 (option 1), because the receiving terminal feeds back the HARQ information on one PSFCH resource, determining the PSFCH resource based on the PSSCH resource and the identification information of the terminal causes a waste of the PSFCH resource. However, for the multicast feedback manner 2 (option 2), because receiving terminals in the group need to feed back the NACKs or ACKs on a plurality of PSFCH resources, determining the PSFCH resource based on the PSSCH resource and the identification information of the terminal causes insufficient PSFCH resource. Therefore, for different cast types and HARQ feedback manners, resource sizes are different. Therefore, how to perform resource allocation to improve resource utilization is a technical problem that urgently needs to be resolved currently.

In view of the foregoing problem, some embodiments provide a feedback resource determining method. A first terminal device obtains a first parameter, and determines a PSFCH based on the first parameter. The first parameter is related to a cast type and a HARQ feedback manner. The cast type includes unicast and multicast. The HARQ feedback manner corresponds to the cast type (cast type). The first terminal device determines the PSFCH based on the first parameter that is related to the cast type and the HARQ feedback manner, so that PSFCHs of different sizes are allocated for different cast types and HARQ feedback manners. This improves resource utilization.

In addition, the PSFCH resource is determined in an implicit association manner in a protocol. A feedback resource used for a PSFCH transmission in a slot is first configured based on a higher layer parameter, and then a resource used to send the PSFCH is evenly allocated for each subchannel (subchannel) in the resource pool and a slot corresponding to each PSFCH. The resource used to send the PSFCH is an RB. However, in this allocation manner, a quantity of allocated RBs are unable to be an integer. Consequently, the terminal device is unable to use these resources, causing a waste of resources.

In view of the foregoing problem, some embodiments provide a feedback resource determining method. A quantity X of PSSCH transmissions is determined based on a quantity of subchannels and a quantity of slots corresponding to a PSFCH, and then a quantity of available resource blocks RBs for a PSFCH is determined based on the quantity X of PSSCH transmissions. The quantity of available RBs for the PSFCH is an integer. A quantity of available resource blocks RBs for a PSFCH corresponding to each of first T PSSCH transmissions is at least one more than a quantity of available RBs for a PSFCH corresponding to each of X-T PSSCH transmissions. T is a positive integer, and X is a positive integer greater than T. The quantity of available resource blocks RBs for the PSFCH is determined based on a quantity M of PSSCH transmissions, and the quantity of available resource blocks RBs for the PSFCH corresponding to each of the first T PSSCH transmissions is at least one more than a quantity of available RBs for a PSFCH corresponding to each of M-T PSSCH transmissions, to ensure that the quantity of available RBs allocated to the PSFCH corresponding to each PSSCH transmission is an integer. This optimizes resource allocation, and improve resource utilization.

In addition, in one PSFCH slot, the second terminal device feeds back PSFCHs to a plurality of first terminal devices at the same time, or feeds back PSFCHs for a plurality of PSSCH transmissions sent by one first terminal device, so that the first terminal device needs to send a plurality of PSFCHs on a same time domain resource. Therefore, how the first terminal device determines a quantity of the plurality of PSFCHs that is sent on the same time domain resource is a technical problem that urgently needs to be resolved currently.

In view of the foregoing problem, some embodiments provide a feedback resource determining method. First information is obtained, and a quantity of PSFCHs sent on a same time domain resource is determined based on the first information, so that the quantity of PSFCHs that is sent on the same time domain resource is determined based on the first information. Therefore, this ensures that transmission of the terminal device does not exceed maximum power, and improve PSFCH transmission performance.

The following describes the technical solutions of some embodiments in detail. Some embodiments are mutually combined, and same or similar concepts or processes.

Figure 5:
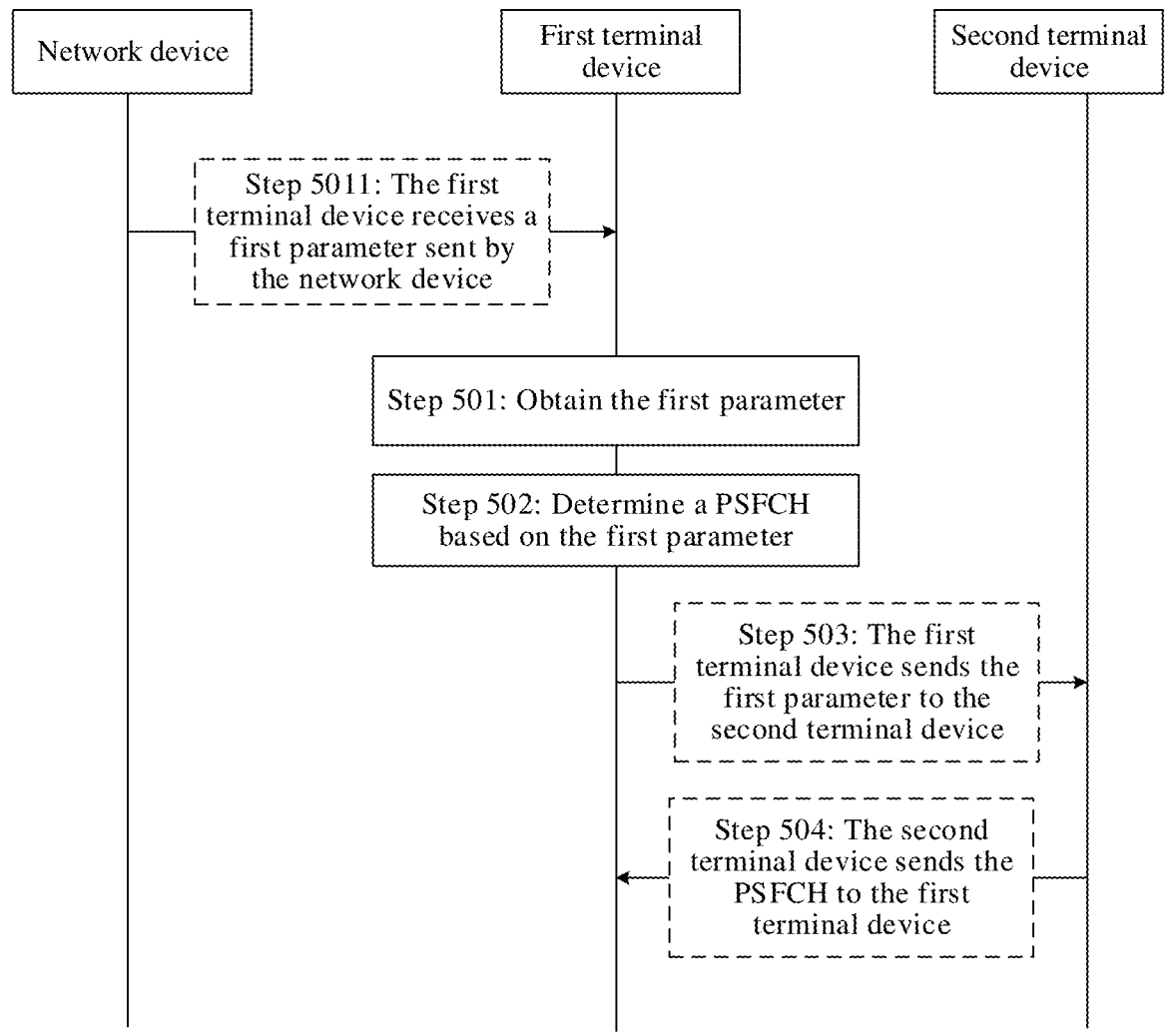
FIG. 5 is a signaling interaction diagram of a feedback resource determining method according to some embodiments.

FIG. 5 is a signaling interaction diagram of a feedback resource determining method according to some embodiments. This embodiment is described by using an example in which a first terminal device is a terminal device at a transmit end, a second terminal device is a terminal device at a receive end, and the first terminal device and the second terminal device exchange information. On the basis of some embodiments shown in FIG. 1 to FIG. 4, as shown in FIG. 5, the feedback resource determining method in this embodiment includes the following steps.

Step 501: Obtain a first parameter.

The first parameter is related to a cast type (cast type) and a HARQ feedback manner. The cast type includes unicast and multicast, and the HARQ feedback manner corresponds to the cast type.

If the cast type is unicast, there is one HARQ feedback manner, that is, a NACK or an ACK is fed back on a PSFCH. If the cast type is multicast, the HARQ feedback manner includes a multicast feedback manner 1 (option 1) and a multicast feedback manner 2 (option 2). In some embodiments, the cast type further includes broadcast. If the cast type is the broadcast, the second terminal device does not feed back a HARQ to the first terminal device.

For example, the first terminal device obtains the first parameter in the following several manners:

A first manner: As shown in step 5011 in FIG. 5, the first terminal device receives the first parameter sent by a network device.

The network device determines the first parameter based on the cast type and the HARQ feedback manner, and send the determined first parameter to the first terminal device through higher layer signaling or dynamic signaling. The higher layer signaling is signaling sent by a higher layer protocol layer. The higher layer protocol layer is at least one protocol layer above a physical layer. The higher layer protocol layer includes at least one of the following protocol layers: a medium access control (medium access control, MAC) layer, a radio link control (radio link control, RLC) layer, a packet data convergence protocol (packet data convergence protocol, PDCP) layer, a radio resource control (radio resource control, RRC) layer, a non-access stratum (non-access stratum, NAS), and the like. In this case, the higher layer signaling includes RRC signaling, a MAC control element (control element, CE), and the like. The dynamic signaling includes downlink control information (downlink control information, DCI), sidelink control information (sidelink control information, SCI), and the like.

A second manner: The first parameter is determined based on at least one parameter set. The parameter set is configured or preconfigured based on higher layer signaling.

A network device determines one or more parameter sets based on the cast type and the HARQ feedback manner. Each parameter set includes at least one parameter. The network device sends the determined one or more parameter sets to the first terminal device through higher layer signaling or dynamic signaling. The first terminal device selects one parameter from the at least one parameter set sent by the network device as the first parameter, or the network device indicates one parameter to the first terminal device in the at least one parameter set through higher layer signaling or dynamic signaling. The higher layer signaling is signaling sent by a higher layer protocol layer. The higher layer protocol layer is at least one protocol layer above a physical layer. The upper layer protocol layer includes at least one of the following protocol layers: a MAC layer, an RLC layer, a PDCP layer, an RRC layer, a NAS, and the like. The dynamic signaling includes DCI, SCI, and the like.

In addition, the at least one parameter set alternatively is preconfigured in a protocol. The first terminal device selects one parameter from the at least one parameter set preconfigured in the protocol as the first parameter.

In some embodiments, to better improve resource utilization in different cast types and HARQ feedback manners, a value of the first parameter is not equal to 1.

For example, a value in the parameter set includes at least one of $1/M_1$, $1/0.3$, $1/0.2$, or $1/0.15$. $M_1$ is a quantity of frequency domain resources of a PSFCH corresponding to each PSSCH. $M_1$ is related to a resource allocated for feedback by the PSFCH, a quantity of subchannels in the resource pool, and a quantity of slots corresponding to the PSFCH.

In some embodiments, if the cast type is unicast, the first parameter is $1/M_1$. In this way, frequency domain resources of the PSFCH is saved.

A third manner 3: The first terminal device obtains the first parameter based on a correspondence that is between a parameter and a cast type and a HARQ feedback manner and that is preconfigured in a resource pool.

At least one parameter is preconfigured in the resource pool. These parameters correspond to the cast type and the HARQ feedback manner. For example, a parameter corresponding to unicast is a, a parameter corresponding to the multicast feedback manner 1 (option 1) is b, and a parameter corresponding to the multicast feedback manner 2 (option 2) is c. The first terminal device selects the first parameter based on the cast type and the HARQ feedback manner corresponding to the cast type. For example, if the cast type is unicast, the first terminal device determines that the first parameter is a. If the cast type is multicast, and the HARQ feedback manner is a feedback manner 2 (option2), the first terminal device determines that the first parameter is c. Optionally, a is the same as c.

Step 502: Determine a PSFCH based on the first parameter.

The PSFCH further is understood as a frequency domain resource for the PSFCH.

In this step, after obtaining the first parameter, the first terminal device determines the PSFCH based on the first parameter.

For example, a size of an original resource preallocated by the network device to the first terminal device is adjusted based on the first parameter. The original resource is a quantity M1 of frequency domain resources evenly allocated to PSFCHs corresponding to each PSSCH transmission.

Optionally, $M_1 = M_0/(N_1 \times N_2)$, where $M_0$ indicates a quantity of resources for a PSFCH, and the quantity of resources is configured based on a higher layer parameter. $N_1$ indicates a quantity of PSSCH slots associated with one PSFCH slot, and further is understood as a PSFCH period. $N_2$ indicates the quantity of subchannels in the resource pool.

Further, the HARQ feedback manner includes a first manner and a second manner. The PSFCH includes a first PSFCH and a second PSFCH. The first PSFCH is used to transmit HARQ information of unicast information and HARQ information fed back in the first manner. The second PSFCH is used to transmit HARQ information fed back in the second manner.

The first manner is the multicast feedback manner 1 (option 1). The second manner is the multicast feedback manner 2 (option 2).

In this embodiment, the PSFCH includes two parts: one part is used to transmit the HARQ information of the unicast information and the HARQ information fed back in the first manner, and the other part is used to transmit the HARQ information fed back in the second manner. This improves resource utilization.

In some embodiments, when the unicast and the multicast feedback manner 1 (option 1) are used, the PSFCH is determined according to the following formula (1):

$$R_1 = M_i \cdot Q_1 \quad (1)$$

$R_1$ indicates a quantity of PSFCHs corresponding to one PSSCH transmission when the unicast and the multicast feedback manner 1 (option 1) are used, and further is understood as a quantity of physical resource blocks (physical resource blocks, PRBs) occupied by the PSFCH corresponding to one PSSCH transmission. $Q_1$ indicates a first parameter corresponding to the unicast and the multicast feedback manner 1 (option 1).

Further, a total quantity of PSFCHs is determined according to the following formula (2):

$$R_2 = N_3 \times M_1 \times Q_1 \times N_4 \quad (2)$$

$R_2$ indicates a quantity of resources for one PSFCH. $N_3$ is a quantity of subchannels occupied by the PSSCH. $N_3$ is a positive integer greater than or equal to 1. $N_4$ is a quantity of cyclic shift value pairs on each resource unit configured through higher layer signaling. $N_4$ is a positive integer ranging from 1 to 6.

In some embodiments, when the multicast feedback manner 2 (option 2) is used, the PSFCH is determined according to the following formula (3):

$$R_3 = M_1 \times Q_2 \quad (3)$$

$R_3$ indicates a quantity of PSFCHs corresponding to one PSSCH transmission when the multicast feedback manner 2 (option 2) is used. $Q_2$ indicates a first parameter corresponding to the multicast feedback manner 2 (option 2).

Further, a total quantity of PSFCHs is determined according to the following formula (4):

$$R_4 = N_3 \times M_1 \times Q_2 \times N_4 \quad (4)$$

$R_4$ indicates the quantity of resources for one PSFCH.

For example, the value of the first parameter varies with different cast types and HARQ feedback manners. For example, when the unicast and the multicast feedback manner 1 (option 1) are used, the first parameter is $1/M_1$. When the multicast feedback manner 2 (option 2) is used, the first parameter is 1/0.3. In this way, quantities of PSFCHs determined according to the formulas (1), (2), (3), and (4) are further different. PSFCHs of different sizes are allocated for different cast types and HARQ feedback manners. This improves resource utilization.

Based on the foregoing embodiment, when the unicast and the multicast feedback manner 1 (option 1) are used, a PSFCH resource index is $[(i+j \times N_1) \times M_1 \times Q_1, (i+1+j \times N_1) \times M_1 \times Q_1 - 1]$ where i is a slot index corresponding to the PSFCH, and j is an index of a subchannel in the resource pool.

When the multicast feedback manner 2 (option 2) is used, a PSFCH resource index is $[(i+j \times N_1) \times M_1 \times Q_2, (i+1+j \times N_1) \times M_1 \times Q_2 - 1]$.

Further, the PSFCH determined according to the formulas (1), (2), (3), and (4) includes two parts: the first PSFCH and the second PSFCH. In some embodiments, after the two parts of PSFCHs are obtained, the two parts of PSFCHs further need to be correspondingly mapped to an actual physical resource.

In some embodiments, the first PSFCH is mapped in ascending order of resource indexes in frequency domain, and the second PSFCH further is mapped in ascending order of resource indexes in frequency domain. The first PSFCH and the second PSFCH do not overlap in frequency domain.

When the cast type is the unicast and the multicast feedback manner 1 (option 1), the determined PSFCH is the first PSFCH, and a mapping range of the first PSFCH in frequency domain is $k_1$ to $(k_1+X-1)$, where $k_1$ indicates a minimum value of a frequency domain resource index of the PSFCH, and X indicates a maximum quantity of PSSCH transmissions corresponding to the PSFCH slot. When the multicast feedback manner 2 (option 2) is used, the determined PSFCH is the second PSFCH, and a mapping range of the second PSFCH in frequency domain is $(k_1+X)$ to $k_2$, where $k_2$ is less than or equal to a maximum value of a frequency domain resource index of the PSFCH.

In addition, the mapping range of the first PSFCH in frequency domain further is represented as $k_1$ to $k_1+N_1 \times N_2 \times Q_1 - 1$. The mapping range of the second PSFCH in frequency domain further is represented as $k_1+N_1 \times N_2 \times Q_1 - 1$ to $k_2$.

Figure 6A:
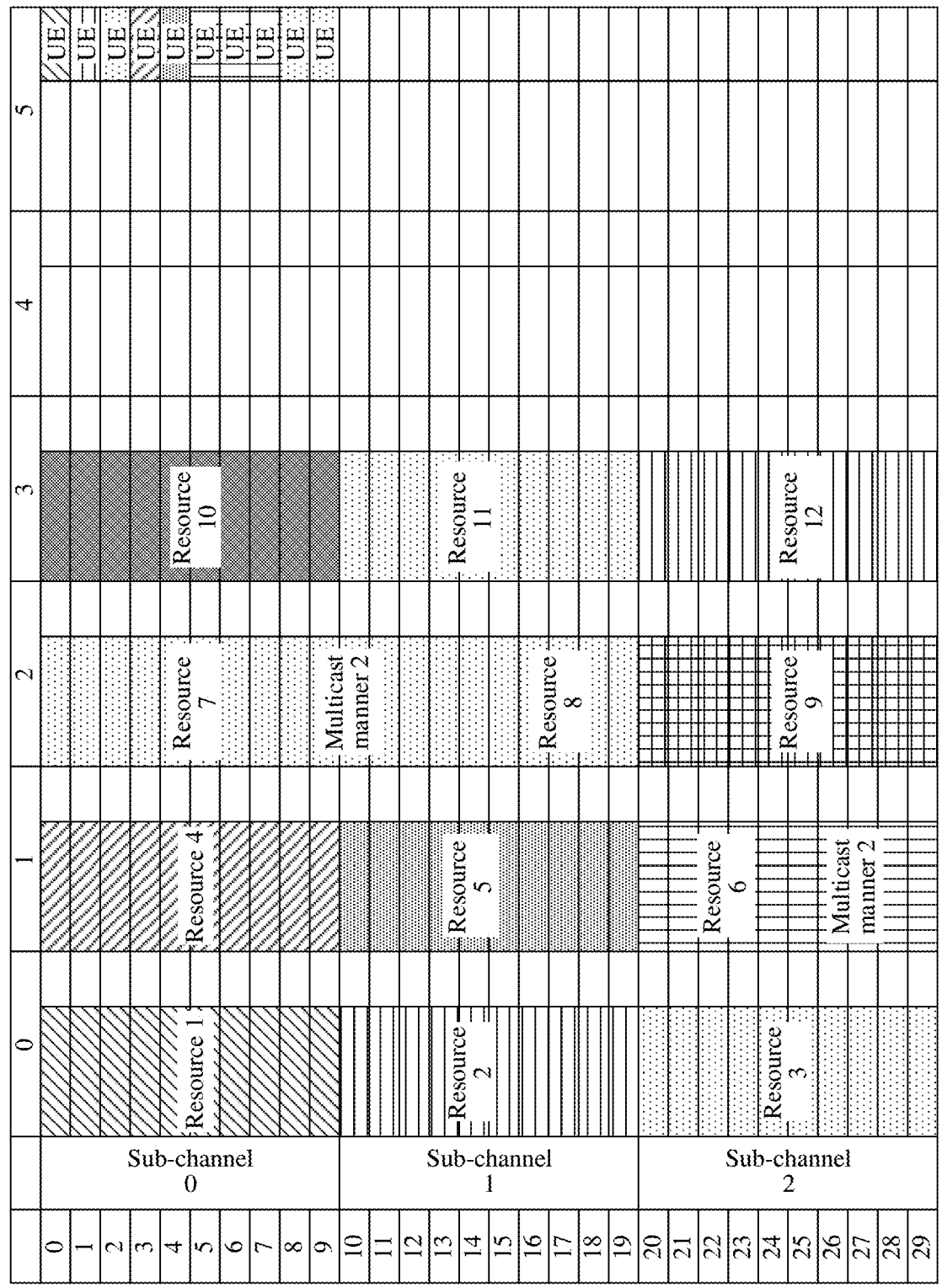
FIG. 6a is a schematic diagram of mapping of a first PSFCH and a second PSFCH in frequency domain according to some embodiments.

FIG. 6a is a schematic diagram of mapping of the first PSFCH and the second PSFCH in frequency domain according to some embodiments. In FIG. 6a, an example in which the first terminal device is UE is used for description. When the first terminal device is another entity, a resource mapping manner is similar to a mapping manner used when the first terminal device is the UE. Details are not described herein again. As shown in FIG. 6a, frequency domain resources in a slot 5 are used to send the PSFCH. Each PSSCH transmission occupies one or more resources. Each resource corresponds to one slot and one subchannel. When a cast type corresponding to PSSCH transmissions on resources 1 to 5 and 9 to 12 is the unicast, or a HARQ feedback manner is the multicast feedback manner 1 (option 1), a PSFCH corresponding to the PSSCH transmissions on the resources 1 to 5 and 9 to 12 is the first PSFCH, and the mapping range of the first PSFCH in frequency domain is a frequency domain resource index 0 to a frequency domain resource index 11 corresponding to a subchannel 0. When a HARQ feedback manner corresponding to PSSCH transmissions on resources 6 to 8 is the multicast feedback manner 2 (option 2), a PSFCH corresponding to the PSSCH transmissions on the resources 6 to 8 is the second PSFCH, and the mapping range of the second PSFCH in frequency domain is a frequency domain resource index 12 to a frequency domain resource index 29.

In some embodiments, the first PSFCH is mapped in descending order of resource indexes in frequency domain, and the second PSFCH further is mapped in descending order of resource indexes in frequency domain. The first PSFCH and the second PSFCH do not overlap in frequency domain.

When the cast type is the unicast and the multicast feedback manner 1 (option 1), the determined PSFCH is the first PSFCH, and a mapping range of the first PSFCH in frequency domain is $k_2$ to $(k_2+X)$. When the multicast feedback manner 2 (option 2) is used, the determined PSFCH is the second PSFCH, and a mapping range of the second PSFCH in frequency domain is $(k_2+X-1)$ to $k_1$.

In addition, the mapping range of the first PSFCH in frequency domain further is represented as $k_2$ to $k_2+N_1 \times N_2 \times Q_1$. The mapping range of the second PSFCH in frequency domain further is represented as $k_2+N_1 \times N_2 \times Q_1-1$ to $k_1$.

In some embodiments, the first PSFCH is mapped in ascending order of resource indexes in frequency domain, and the second PSFCH further is mapped in descending order of resource indexes in frequency domain. The first PSFCH and the second PSFCH do not overlap in frequency domain.

When the cast type is the unicast and the multicast feedback manner 1 (option 1), the determined PSFCH is the first PSFCH, and a mapping range of the first PSFCH in frequency domain is $k_1$ to $(k_1+X-1)$. When the multicast feedback manner 2 (option 2) is used, the determined PSFCH is the second PSFCH, and a mapping range of the second PSFCH in frequency domain is $k_2$ to $(k_2-X+1)$.

In addition, the mapping range of the first PSFCH in frequency domain further is represented as $k_1$ to $k_1+N_1 \times N_2 \times Q_1-1$. The mapping range of the second PSFCH in frequency domain further is represented as $k_2$ to $(k_2-N_1 \times N_2 \times Q_1+1)$.

Figure 6B:
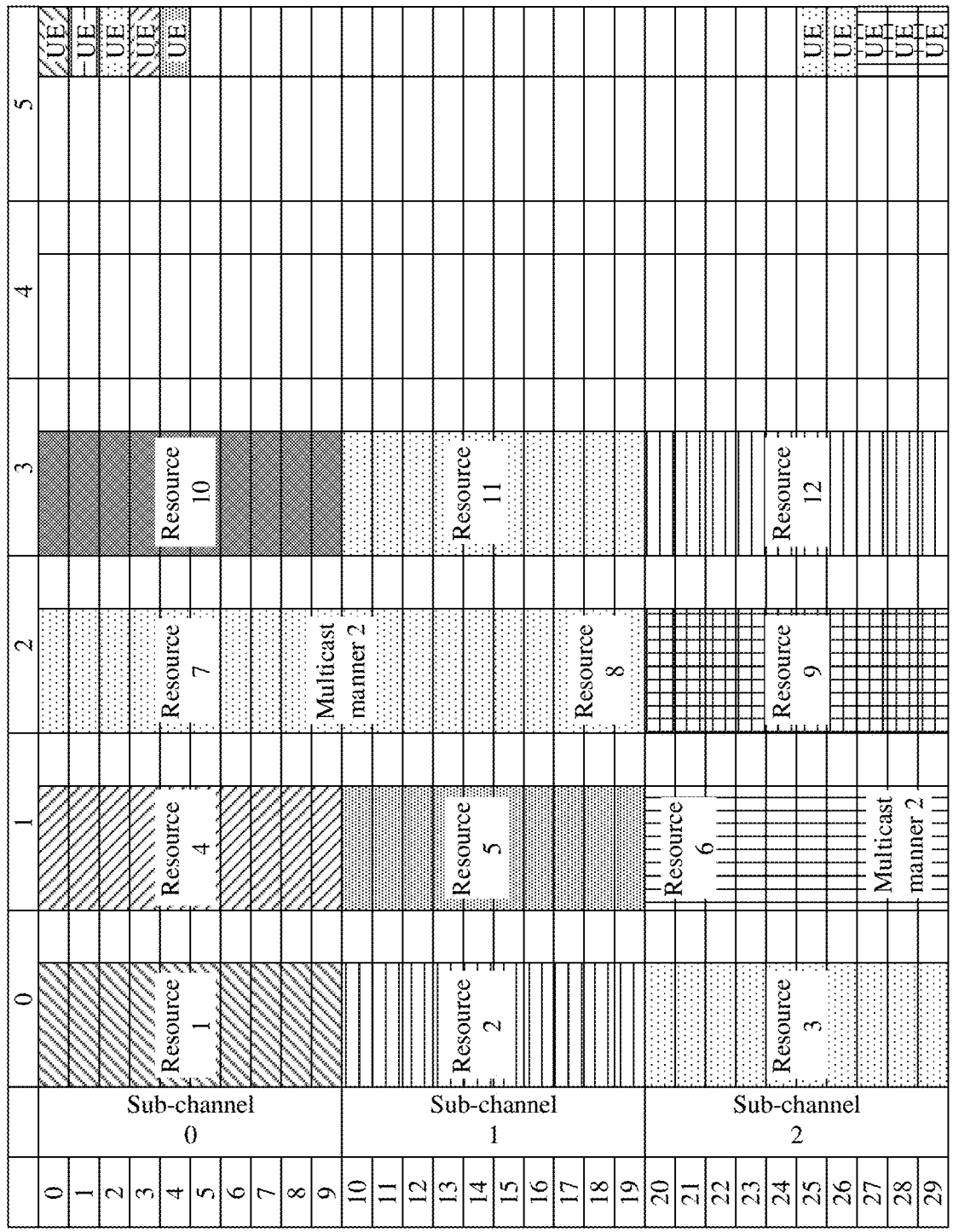
FIG. 6b is another schematic diagram of mapping of a first PSFCH and a second PSFCH in frequency domain according to some embodiments.

FIG. 6b is another schematic diagram of mapping of the first PSFCH and the second PSFCH in frequency domain according to some embodiments. In FIG. 6b, an example in which the first terminal device is UE is used for description. When the first terminal device is another entity, a resource mapping manner is similar to a mapping manner used when the first terminal device is the UE. Details are not described herein again. As shown in FIG. 6b, frequency domain resources in a slot 5 are used to send the PSFCH. Each PSSCH transmission occupies one or more resources. Each resource corresponds to one slot and one subchannel. When a cast type corresponding to PSSCH transmissions on resources 1 to 5 and 9 to 12 is the unicast, or a HARQ feedback manner is the multicast feedback manner 1 (option 1), a PSFCH corresponding to the PSSCH transmissions on the resources 1 to 5 and 9 to 12 is the first PSFCH, and the mapping range of the first PSFCH in frequency domain is a frequency domain resource index 0 to a frequency domain resource index 11 corresponding to a subchannel 0. When a HARQ feedback manner corresponding to PSSCH transmissions on resources 6 to 8 is the multicast feedback manner 2 (option 2), a PSFCH corresponding to the PSSCH transmissions on the resources 6 to 8 is the second PSFCH, and the mapping range of the second PSFCH in frequency domain is a frequency domain resource index 29 to a frequency domain resource index 12.

In yet still another possible implementation, the first PSFCH is mapped in descending order of resource indexes in frequency domain, and the second PSFCH further is mapped in ascending order of resource indexes in frequency domain. The first PSFCH and the second PSFCH do not overlap in frequency domain.

When the cast type is the unicast and the multicast feedback manner 1 (option 1), the determined PSFCH is the first PSFCH, and a mapping range of the first PSFCH in frequency domain is $k_2$ to $(k_2-X+1)$. When the multicast feedback manner 2 (option 2) is used, the determined PSFCH is the second PSFCH, and a mapping range of the second PSFCH in frequency domain is $k_1$ to $(k_1+X-1)$.

In addition, the mapping range of the first PSFCH in frequency domain further is represented as $k_2$ to $(k_2-N_1 \times N_2 \times Q_1+1)$ The mapping range of the second PSFCH in frequency domain further is represented as $k_1$ to $(k_1+N_1 \times N_2 \times Q_1-1)$.

In some embodiments, the maximum quantity X of PSSCH transmissions corresponding to the PSFCH slot is determined based on the quantity of subchannels and the PSFCH period.

Further, a person skilled in the art understands that, after obtaining the first parameter, the first terminal device further determines, based on the first parameter, the PSSCH or data carried on the PSFCH. A manner of determining the PSSCH or the data carried on the PSFCH is similar to a manner of determining the PSFCH. Details are not described herein again.

In addition, for example, the first parameter is further related to a quantity of bits of a HARQ carried on the PSFCH.

A value of the first parameter varies with different quantities of bits of HARQs carried on PSFCHs. For example, when there is a larger quantity of bits of the HARQ carried on the PSFCH, a value of the first parameter is larger, and therefore a larger quantity of PSFCHs are determined. The HARQ transmission performance is ensured. When there is a smaller quantity of bits of the HARQ carried on the PSFCH, a value of the first parameter is smaller, and therefore a smaller quantity of PSFCHs are determined. This reduces a waste of resources. In conclusion, different PSFCHs determined vary with different quantities of bits of HARQs carried on the PSFCHs. This ensures HARQ transmission performance, and improve resource utilization.

Further, after obtaining the first parameter, the first terminal device further performs the following step 503.

Step 503: The first terminal device sends the first parameter to the second terminal device.

After obtaining the first parameter, the first terminal device sends the first parameter to the second terminal device. The second terminal device determines the PSFCH based on the received first parameter, to learn of the PSFCH on which the HARQ is fed back to the first terminal device.

A manner in which the second terminal device determines the PSFCH based on the first parameter is similar to a manner in which the first terminal device determines the PSFCH based on the first parameter. Details are not described herein again.

The steps 502 and 503 are not subject to a sequence in some embodiments. Step 502 is performed before the step 503, or step 503 is performed before step 502. Certainly, the step 502 and step 503 is simultaneously performed.

In addition, when the cast type is the unicast, or the HARQ feedback manner is the multicast feedback manner 2 (option 2), the second terminal device feeds back NACK information to the first terminal device when the second terminal device does not receive the data or when a cyclic redundancy check (cyclical redundancy check, CRC) on the data fails, and feeds back ACK information to the first terminal device when the second terminal device receives the data or when the CRC on the data succeeds. When the HARQ feedback manner is the multicast feedback manner 1 (option 1), the second terminal device feeds back NACK information to the first terminal device when the second terminal device does not receive the data or when the CRC check on the data fails, and does not feed back ACK information to the first terminal device when the second terminal device receives the data or when the CRC check on the data succeeds. Therefore, when the cast type is the unicast, or the HARQ feedback manner is the multicast feedback manner 2 (option 2), and the HARQ feedback manner is the multicast feedback manner 1 (option 1), and no data is received or the CRC check on the data fails, the second terminal device feeds back the HARQ to the first terminal device, performs the following step 504.

Step 504: The second terminal device sends the PSFCH to the first terminal device.

That the second terminal device sends the PSFCH to the first terminal device further is understood as that the second terminal device feeds back the HARQ to the first terminal device through the determined PSFCH.

According to the feedback resource determining method provided in some embodiments, the first terminal device obtains the first parameter, and determines the PSFCH based on the first parameter. The first parameter is related to the cast type and the HARQ feedback manner. The cast type includes the unicast and the multicast. The HARQ feedback manner corresponds to the cast type. The first terminal device determines the PSFCH based on the first parameter that is related to the cast type and the HARQ feedback manner, so that PSFCHs of different sizes are allocated for different cast types and HARQ feedback manners. This improves resource utilization.

Figure 7:
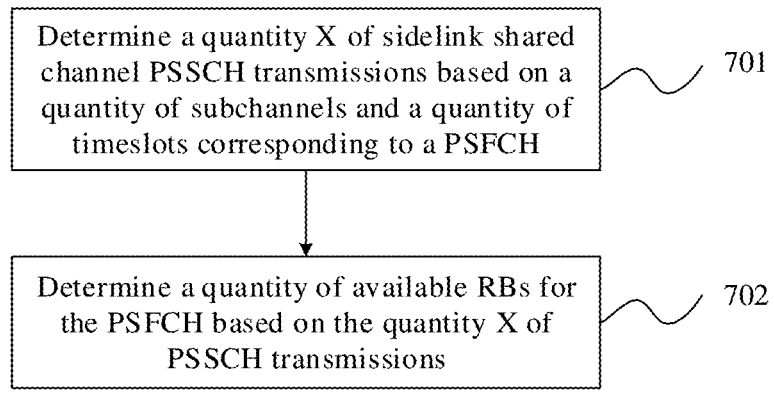
FIG. 7 is a schematic flowchart of a feedback resource determining method according to some embodiments.

FIG. 7 is a schematic flowchart of a feedback resource determining method according to some embodiments. On the basis of some embodiments shown in FIG. 1 to FIG. 4, as shown in FIG. 7, the feedback resource determining method in this embodiment includes the following steps.

Step 701: Determine a quantity X of sidelink shared channel PSSCH transmissions based on a quantity of subchannels and a quantity of slots corresponding to a PSFCH.

In this step, the subchannel is a subchannel in a resource pool. The quantity of slots corresponding to the PSFCH is a quantity of slots of a PSSCH associated with a PSFCH slot, or the quantity of slots corresponding to the PSFCH is understood as a PSFCH period.

In addition, a quantity M of PSSCH transmissions determined based on the quantity of subchannels and the quantity of slots corresponding to the PSFCH further is understood as a maximum quantity of PSSCH transmissions.

Step 702: Determine a quantity of available RBs for a PSFCH based on the quantity X of PSSCH transmissions.

The quantity of available resource blocks (Resource Blocks, RBs) for the PSFCH is an integer. A quantity of available resource blocks RBs for a PSFCH corresponding to each of first T PSSCH transmissions is at least one more than a quantity of available RBs for a PSFCH corresponding to each of X-T PSSCH transmissions. T is a positive integer, and X is a positive integer greater than T.

In some embodiments, when sidelink HARQ feedback is enabled, the available RB for the PSFCH is understood as an RB corresponding to the PSSCH, that is, the RB for the PSFCH for a terminal device. When the sidelink HARQ feedback is disabled, the terminal device is unable to feed back the PSFCH, or there is no PSSCH transmission on a PSSCH resource, and the RB corresponding to the PSSCH does not transmit the PSFCH.

In an existing protocol, a PSFCH resource is determined in an implicit association manner. A feedback resource used for a PSFCH transmission in a slot is first configured based on a higher layer parameter, and then a resource used to send the PSFCH is evenly allocated for each subchannel (subchannel) in the resource pool and a slot corresponding to each PSFCH. For example, the resource is allocated, according to a formula (5), to an nth subchannel and a slot corresponding to an mth PSFCH:

$$M_1 = M_2/(N_2 \times N_1) \quad (5)$$

$M_2$ is a quantity of frequency domain resources that are used to send the PSFCH in each PSFCH slot in the resource pool, and the quantity of frequency domain resources is configured by a higher layer parameter, that is, a quantity of PRBs. i is greater than or equal to 0 and less than $N_1$, and j is greater than or equal to 0 and less than $N_2$.

In the foregoing formula (5), $N_2 \times N_1$ is understood as the quantity X of PSSCH transmissions, or is understood as the maximum quantity of PSSCH transmissions.

However, when resource allocation is performed according to the formula (5), a quantity of allocated resources are unable to be an integer. Consequently, the terminal device is unable to use these resources, causing a waste of resources.

Therefore, to resolve the foregoing problem, in some embodiments, after the quantity X of PSSCH transmissions is determined, when the quantity of available RBs for the PSFCH is determined, the foregoing even allocation manner is not used. Instead, the quantity of available RBs for the PSFCH corresponding to each of first T PSSCH transmissions is at least one more than the quantity of available RBs for the PSFCH corresponding to each of X-T PSSCH transmissions. Therefore, to ensure that the determined quantity of available RBs for the PSFCH is an integer, and a remaining idle resource is allocated to a terminal device in the front. This reduces a waste of resources, and improve resource utilization.

In some embodiments, a quantity of complete PRBs that is unable to be evenly allocated to each subchannel and the slot corresponding to each PSFCH, and a quantity of complete PRBs allocated to each subchannel and the slot corresponding to each PSFCH is calculated according to formulas (6) and (7):

$$T = M_2 \bmod (N_2 \times N_1) \quad (6)$$

$$M_3 = \lfloor M_2/(N_2 \times N_1) \rfloor \quad (7)$$

T indicates a quantity of remaining PRBs that is unable to be evenly allocated after a quantity of complete PRBs evenly allocated to the PSFCH corresponding to each PSSCH is determined. $M_3$ indicates the quantity of complete PRBs allocated to the PSFCH corresponding to each PSSCH.

During resource allocation, the quantity of available RBs are allocated to the PSFCH corresponding to each PSSCH transmission in ascending order of time domains and then in ascending order of frequency domains. The quantity of available RBs are allocated to the PSFCH corresponding to each PSSCH transmission in ascending order of slot indexes and then in ascending order of subchannel indexes or PRB indexes.

In an implementation process, when $i+j \times N_1$ is less than or equal to T, that is, the quantity of available RBs for the PSFCH corresponding to each of the first T PSSCH transmissions are allocated according to a formula (8):

$$M_4 = M_3 + 1 \quad (8)$$

$M_4$ indicates the quantity of available RBs for the PSFCH corresponding to each of the first T PSSCH transmissions.

When $i+j \times N_1$ is greater than T, that is, the quantity of available RBs for the PSFCH corresponding to each of the remaining $N_2 \times N_1 - T$ PSSCH transmissions, namely the quantity of available RBs for the PSFCH corresponding to each of the X-T PSSCH transmissions, are allocated according to a formula (9):

$$M_5 = M_3 \quad (9)$$

$M_5$ indicates the quantity of available RBs for the PSFCH corresponding to each of the X-T PSSCH transmissions.

In conclusion, the quantity of available RBs for the PSFCH determined in the foregoing manner is an integer. This reduces a waste of resources, and improve resource utilization.

In addition, one PSSCH transmission occupies a plurality of subchannels. Therefore, a quantity of available RBs for a PSFCH corresponding to the PSSCH transmission is further related to a quantity of subchannels occupied by the PSSCH, and is allocated according to a formula (10):

$$R = N_3 \times M_1 \quad (10)$$

R indicates a quantity of PRBs occupied by the PSFCH corresponding to the PSSCH transmission.

When $N_3=1$, the quantity of available RBs for the PSFCH corresponding to the PSSCH transmission is $M_1$. When $N_3=N_2$, the quantity of available RBs for the PSFCH corresponding to the PSSCH transmission is $N_2 \times M_1$.

On the basis of the foregoing embodiments, in some embodiments, the quantity of available resource blocks RBs for the PSFCH corresponding to each of the first T PSSCH transmissions is one more than the quantity of available RBs for the PSFCH corresponding to each of the X-T PSSCH transmissions.

According to the feedback resource determining method provided in some embodiments, the quantity X of PSSCH transmissions is determined based on the quantity of subchannels and the quantity of slots corresponding to the PSFCH. X is a positive integer. Then the quantity of available resource blocks RBs for the PSFCH is determined based on the quantity X of PSSCH transmissions. The quantity of available RBs for the PSFCH is an integer. The quantity of available resource blocks RBs for the PSFCH corresponding to each of the first T PSSCH transmissions is at least one more than the quantity of available RBs for the PSFCH corresponding to each of the X-T PSSCH transmissions. T is a positive integer. The quantity of available resource blocks RBs for the PSFCH is determined based on a quantity M of PSSCH transmissions, and the quantity of available resource blocks RBs for the PSFCH corresponding to each of the first T PSSCH transmissions is at least one more than a quantity of available RBs for a PSFCH corresponding to each of M-T PSSCH transmissions, to ensure that the quantity of available RBs allocated to the PSFCH corresponding to each PSSCH transmission is an integer. This optimizes resource allocation, and improve resource utilization.

Figure 8:
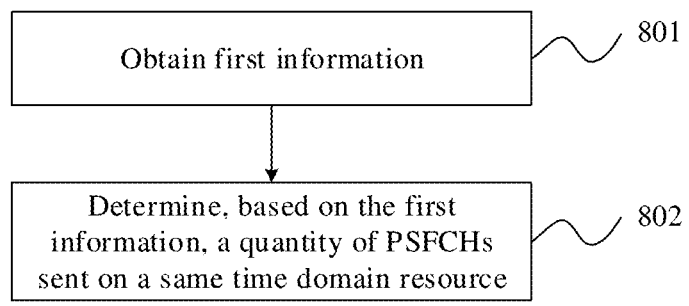
FIG. 8 is a schematic flowchart of a feedback resource determining method according to some embodiments.

FIG. 8 is a schematic flowchart of a feedback resource determining method according to some embodiments. On the basis of some embodiments shown in FIG. 1 to FIG. 4, as shown in FIG. 8, the feedback resource determining method in this embodiment includes the following steps.

Step 801: Obtain first information.

In some embodiments, the first information includes higher layer indication information and/or dynamic indication information. In other words, the first information is higher layer indication information, or is dynamic indication information, or is higher layer indication information and dynamic indication information. The higher layer indication information is information sent by a higher layer protocol layer. The higher layer protocol layer is at least one protocol layer above a physical layer. The upper layer protocol layer includes at least one of the following protocol layers: a MAC layer, an RLC layer, a PDCP layer, an RRC layer, a NAS, an RRC, and a MAC CE. The dynamic indication information includes DCI, SCI, and the like.

In some embodiments, the first information includes transmit power of a first terminal device and/or a minimum communication distance between the first terminal device and a second terminal device. In other words, the first information includes the minimum communication distance between the first terminal device and the second terminal device, or the first information includes the transmit power of the first terminal device, or the first information includes the transmit power of the first terminal device and the minimum communication distance between the first terminal device and the second terminal device.

Step 802: Determine, based on the first information, a quantity of PSFCHs sent on a same time domain resource.

In this step, the PSFCHs sent on the same time domain resource is understood as PSFCHs simultaneously sent on the same time domain resource, or is understood as concurrent PSFCHs on the same time domain resource, or is understood as that these PSFCHs occupy the same time domain resource, or at least one time domain resource unit in time domain resources occupied by these PSFCHs is overlapped. The time domain resource unit includes a slot, a compliance, a frame, a subframe, or the like.

In some embodiments, when the first information is the higher layer indication information and/or the dynamic indication information, a network device sends the higher layer indication information and/or the dynamic indication information to the first terminal device. The higher layer indication information and/or the dynamic indication information includes the quantity of PSFCHs that is sent by the first terminal device on the same time domain resource. For example, the higher layer indication information and/or the dynamic indication information indicate/indicates that the quantity of PSFCHs that is sent by the first terminal device on the same time domain resource is 3.

In this embodiment, the quantity of PSFCHs sent on the same time domain resource is determined based on the higher layer indication information and/or the dynamic indication information, so that determining the quantity of PSFCHs is relatively simple.

In some embodiments, the network device further configures, in a resource pool or sidelink (sidelink, SL) frequency domain, the quantity of PSFCHs that is sent by the first terminal device on the same time domain resource. In this way, the first terminal device determines, based on information configured in the resource pool or SL frequency domain, the quantity of PSFCHs that is sent on the same time domain resource. The SL frequency domain is understood as a carrier (carrier), a bandwidth (band), or a bandwidth combination (band combination).

In this embodiment, the quantity of PSFCHs that is sent by the first terminal device on the same time domain resource is configured in the resource pool or SL frequency domain, so that determining the quantity of PSFCHs is relatively simple.

In some embodiments, when the first information is the minimum communication distance between the first terminal device and the second terminal device, the quantity of PSFCHs sent by the first terminal device on the same time domain resource is determined based on the minimum communication distance between the first terminal device and the second terminal device. For example, a larger minimum communication distance between the first terminal device and the second terminal device indicates a smaller quantity of PSFCHs sent on the same time domain resource. For example, the quantity of PSFCHs sent on the same time domain resource is determined according to the following Table 1:

| Range | Minimum communication distance | Quantity of PSFCHs |
|---|---|---|
| Range 1 | Less than 50 m | 5 |
| Range 2 | Greater than or equal to 50 m and less than 300 m | 3 |
| Range 3 | Greater than or equal to 300 | 1 |

Figure 9:
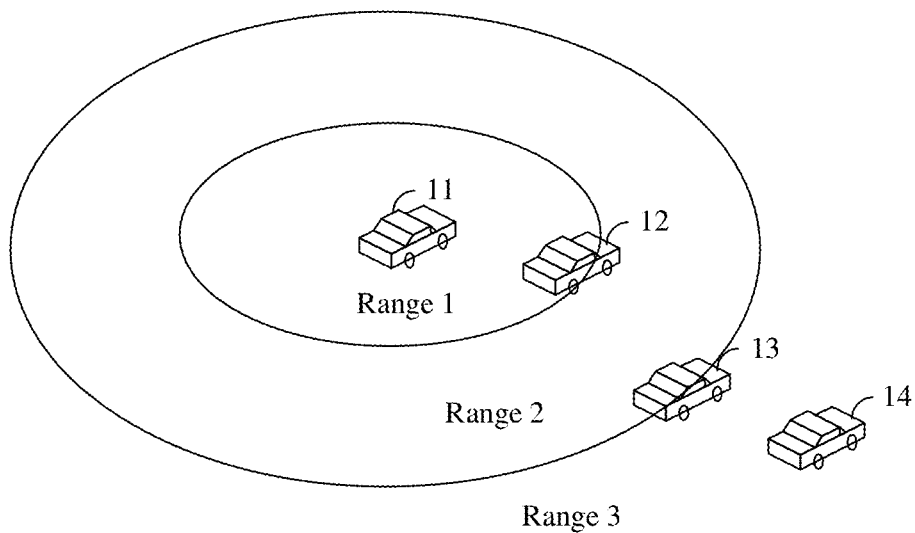
FIG. 9 is a schematic diagram of a minimum communication distance between a first terminal device and a second terminal device according to some embodiments.

For example, FIG. 9 is a schematic diagram of the minimum communication distance between the first terminal device and the second terminal device according to some embodiments. As shown in FIG. 9, if the minimum communication distance between the first terminal device 11 and the second terminal device 12 is less than 50 m, the quantity of PSFCHs sent on the same time domain resource is 5. If the minimum communication distance between the first terminal device 11 and the second terminal device 13 is greater than or equal to 50 m and less than 300 m, the quantity of PSFCHs sent on the same time domain resource is 3. If the minimum communication distance between the first terminal device 11 and the second terminal device 14 is greater than or equal to 300 m, the quantity of PSFCHs sent on the same time domain resource is 1.

In some embodiments, the range and the quantity of PSFCHs sent on the same time domain resource in Table 1 are examples. In some embodiments, the quantity of PSFCHs sent on the same time domain resource is flexibly set based on an actual situation or the minimum communication distance.

In addition, the first terminal device alternatively determines, in another manner, a quantity of PSFCHs sent on the same time domain resource, where the quantity of PSFCHs corresponds to the minimum communication distance. A determining manner is not limited in some embodiments.

In this embodiment, the quantity of PSFCHs sent on the same time domain resource is determined based on the minimum communication distance between the first terminal device and the second terminal device, so that determining the quantity of PSFCHs is relatively simple.

In some embodiments, when the first information is the transmit power of the first terminal device, the quantity of PSFCHs sent by the first terminal device on the same time domain resource is determined based on the transmit power of the first terminal device. For example, the first terminal device determines, by calculating a difference between the transmit power of the first terminal device and maximum transmit power, the quantity of PSFCHs sent on the same time domain resource.

For example, the quantity of PSFCHs sent on the same time domain resource is determined according to the following formula (11):

$$Y = \left\lfloor \frac{P_1 - P_2 - \alpha}{3} \right\rfloor \tag{11}$$

Y indicates the quantity of PSFCHs sent on the same time domain resource. $P_1$ indicates the maximum transmit power. $P_2$ indicates actual transmit power of the terminal device.

The actual transmit power is maximum transmit power of the terminal device in multicast feedback, or is minimum transmit power that meets the minimum communication distance. $\alpha$ is a power back-off value and is related to whether the PSFCHs are continuous in frequency domain.

In this embodiment, the quantity of PSFCHs sent on the same time domain resource is determined based on the transmit power of the first terminal device, so that the transmit power of the first terminal device does not exceed the maximum transmit power. This improves PSFCH transmission performance.

In some embodiments, when the first information is the transmit power of the first terminal device and the minimum communication distance between the first terminal device and the second terminal device, the quantity of PSFCHs sent by the first terminal device on the same time domain resource is determined based on the transmit power of the first terminal device and the minimum communication distance between the first terminal device and the second terminal device. For example, the quantity of PSFCHs sent on the same time domain resource is determined based on a correspondence between the quantity of PSFCHs and the minimum communication distance and the transmit power.

In this embodiment, the quantity of PSFCHs sent on the same time domain resource is determined based on the transmit power of the first terminal device and the minimum communication distance between the first terminal device and the second terminal device, so that the determined quantity of PSFCHs is more accurate. This ensures that the transmit power of the first terminal device does not exceed maximum transmit power, and improve PSFCH transmission performance.

According to the feedback resource determining method provided in some embodiments, the first information is obtained, and the quantity of PSFCHs sent on the same time domain resource is determined based on the first information, so that the quantity of PSFCHs that is sent on the same time domain resource is determined based on the first information. Therefore, this ensures that transmission of the terminal device does not exceed maximum power, and improve PSFCH transmission performance.

Figure 10:
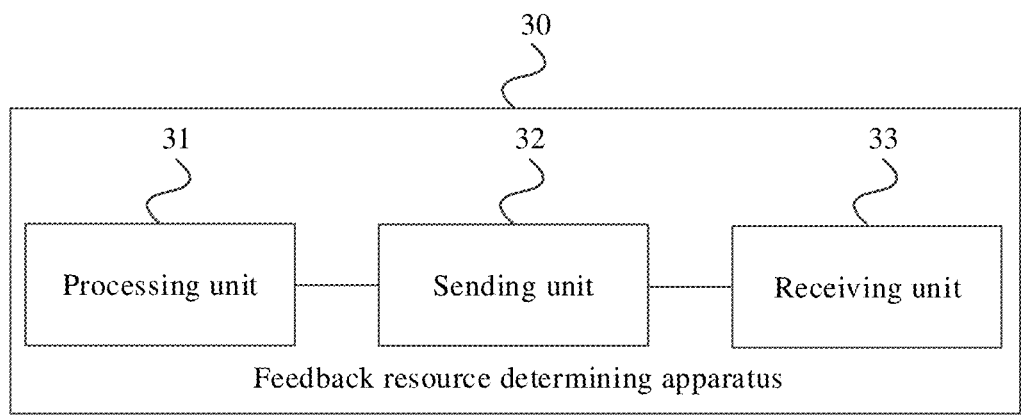
FIG. 10 is a schematic diagram of a structure of a feedback resource determining apparatus 30 according to some embodiments.

FIG. 10 is a schematic diagram of a structure of a feedback resource determining apparatus 30 according to some embodiments. Refer to FIG. 10, the feedback resource determining apparatus 30 includes:

a processing unit 31, configured to obtain a first parameter, where the first parameter is related to a cast type and a hybrid automatic repeat request HARQ feedback manner, the cast type includes unicast and multicast, and the HARQ feedback manner corresponds to the cast type.

The processing unit 31 is further configured to determine a physical sidelink feedback channel PSFCH based on the first parameter.

Optionally, the apparatus further includes:
a sending unit 32, configured to send the first parameter to a second terminal device.

Optionally, the apparatus further includes:
a receiving unit 33, configured to receive the PSFCH sent by the second terminal device.

Optionally, the first parameter is further related to a quantity of bits of a HARQ carried on the PSFCH.

Optionally, the HARQ feedback manner includes a first manner and a second manner. The HARQ feedback manner includes a first manner and a second manner. The PSFCH includes a first PSFCH and a second PSFCH. The first PSFCH is used to transmit HARQ information of unicast information and HARQ information fed back in the first manner. The second PSFCH is used to transmit HARQ information fed back in the second manner.

The feedback resource determining apparatus 30 shown in some embodiments performs a technical solution of the resource determining method shown in any one of the foregoing embodiments. Implementation principles and beneficial effects thereof are similar, and details are not described herein again.

In some embodiments, the unit division of the apparatus is logical function division, and during actual implementation, all or some of the units are integrated into a physical entity, or the units are physically separate. In addition, the units are implemented in a form of software invoking a processing element, or is implemented in a form of hardware; some units are implemented in a form of software invoking a processing element, and some units are implemented in a form of hardware. For example, the sending unit is a separately disposed processing element, or is integrated into a chip of the feedback resource determining apparatus for implementation. In addition, the sending unit is stored in a memory of the feedback resource determining apparatus in a form of a program, and invoked by a processing element of the feedback resource determining apparatus to perform the function of the sending unit. Implementations of the other units are similar thereto. In addition, all or some of the units are integrated, or is independently implemented. The processing element herein is an integrated circuit and has a signal processing capability. In an implementation process, steps of the foregoing method or the foregoing units are implemented by using a hardware integrated logical circuit in the processing element, or by using instructions in a form of software. In addition, the sending unit is a sending control unit, and sends information by using a sending apparatus, such as an antenna and a radio frequency apparatus, of the feedback resource determining apparatus.

The foregoing units are configured as one or more integrated circuits for implementing the foregoing method, for example, one or more application specific integrated circuits (application specific integrated circuits, ASICs), one or more microprocessors (digital signal processors, DSPs), or one or more field programmable gate arrays (field programmable gate arrays, FPGAs). For another example, when one of the foregoing units is implemented in a form of a processing element scheduling a program, the processing element is a general-purpose processor, for example, a central processing unit (central processing unit, CPU) or another processor that invokes a program. For still another example, the units are integrated and implemented in a form of a system-on-a-chip (system-on-a-chip, SOC).

In addition, the processing unit 31 in the foregoing feedback resource determining apparatus 30 is configured to determine a quantity X of sidelink shared channel PSSCH transmissions based on a quantity of subchannels and a quantity of slots corresponding to a PSFCH.

The processing unit 31 is further configured to determine a quantity of available RBs for a PSFCH based on the quantity X of PSSCH transmissions. The quantity of available RBs for the PSFCH is an integer.

A quantity of available resource blocks RBs for a PSFCH corresponding to each of first T PSSCH transmissions is at least one more than a quantity of available RBs for a PSFCH corresponding to each of X-T PSSCH transmissions. T is a positive integer, and X is a positive integer greater than T.

The feedback resource determining apparatus 30 shown in some embodiments performs the technical solution of the resource determining method shown in any one of the foregoing embodiments. Implementation principles and beneficial effects thereof are similar, and details are not described herein again.

In addition, the processing unit 31 in the feedback resource determining apparatus 30 is configured to obtain first information.

The processing unit 31 is further configured to determine, based on the first information, a quantity of physical sidelink feedback channels PSFCHs sent on a same time domain resource.

Optionally, the first information is higher layer indication information and/or dynamic indication information.

Optionally, the first information includes transmit power of a first terminal device and/or a minimum communication distance between the first terminal device and the second terminal device.

The feedback resource determining apparatus 30 shown in some embodiments performs the technical solution of the resource determining method shown in any one of the foregoing embodiments. Implementation principles and beneficial effects thereof are similar, and details are not described herein again.

Figure 11:
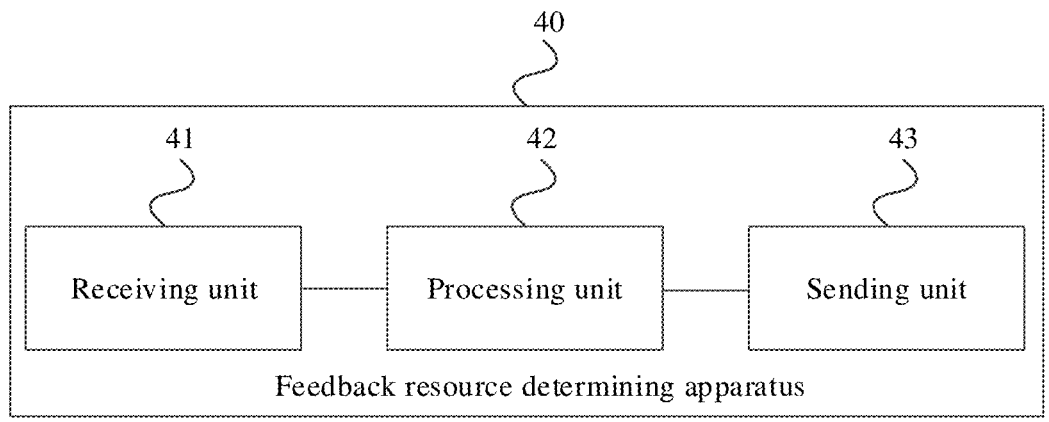
FIG. 11 is a schematic diagram of a structure of a feedback resource determining apparatus 40 according to some embodiments.

FIG. 11 is a schematic diagram of a structure of a feedback resource determining apparatus 40 according to some embodiments. Refer to FIG. 11, the resource determining apparatus 40 includes:

a receiving unit 41, configured to receive a first parameter from a first terminal device, where the first parameter is related to a cast type and a hybrid automatic repeat request HARQ feedback manner, the cast type includes unicast and multicast, and the HARQ feedback manner corresponds to the cast type; and a processing unit 42, configured to determine a physical sidelink feedback channel PSFCH based on the first parameter.

Optionally, the apparatus further includes:
a sending unit 43, configured to send the PSFCH to the first terminal device.

Optionally, the first parameter is further related to a quantity of bits of a HARQ carried on the PSFCH.

Optionally, the HARQ feedback manner includes a first manner and a second manner. The PSFCH includes a first PSFCH and a second PSFCH. The first PSFCH is used to transmit HARQ information of unicast information and HARQ information fed back in the first manner. The second PSFCH is used to transmit HARQ information fed back in the second manner.

The feedback resource determining apparatus 40 shown in some embodiments performs a technical solution of the feedback resource determining method shown in any one of the foregoing embodiments. Implementation principles and beneficial effects thereof are similar, and details are not described herein again.

In some embodiments, the unit division of the apparatus is logical function division, and during actual implementation, all or some of the units are integrated into a physical entity, or the units are physically separate. In addition, the units are implemented in a form of software invoking a processing element, or is implemented in a form of hardware; some units are implemented in a form of software invoking a processing element, and some units are implemented in a form of hardware. For example, the sending unit is a separately disposed processing element, or is integrated into a chip of the feedback resource determining apparatus for implementation. In addition, the sending unit is stored in a memory of the feedback resource determining apparatus in a form of a program, and invoked by a processing element of the feedback resource determining apparatus to perform the function of the sending unit. Implementations of the other units are similar thereto. In addition, all or some of the units are integrated, or is independently implemented. The processing element herein is an integrated circuit and has a signal processing capability. In an implementation process, steps of the foregoing method or the foregoing units are implemented by using a hardware integrated logical circuit in the processing element, or by using instructions in a form of software. In addition, the sending unit is a sending control unit, and sends information by using a sending apparatus, such as an antenna and a radio frequency apparatus, of the feedback resource determining apparatus.

The foregoing units are configured as one or more integrated circuits for implementing the foregoing method, for example, one or more application specific integrated circuits (application specific integrated circuits, ASICs), one or more microprocessors (digital signal processors, DSPs), or one or more field programmable gate arrays (field programmable gate arrays, FPGAs). For another example, when one of the foregoing units is implemented in a form of a processing element scheduling a program, the processing element is a general-purpose processor, for example, a central processing unit (central processing unit, CPU) or another processor that invokes a program. For still another example, the units are integrated and implemented in a form of a system-on-a-chip (system-on-a-chip, SOC).

In addition, some embodiments further provide a feedback resource determining apparatus. The apparatus includes:

a sending unit, configured to send a first parameter to a first terminal device. The first parameter is related to a cast type and a hybrid automatic repeat request HARQ feedback manner. The cast type includes unicast and multicast. The HARQ feedback manner corresponds to the cast type. The first parameter indicates that the first terminal device determines a PSFCH.

In some embodiments, a feedback resource determining apparatus is provided. The apparatus includes:

a sending unit, configured to send first information to a first terminal device. The first information indicates that the first terminal device determines a quantity of physical sidelink feedback channels PSFCHs sent on a same time domain resource.

The feedback resource determining apparatus shown in some embodiments performs the technical solution of the feedback resource determining method shown in any one of the foregoing embodiments. Implementation principles and beneficial effects thereof are similar, and details are not described herein again.

Figure 12:
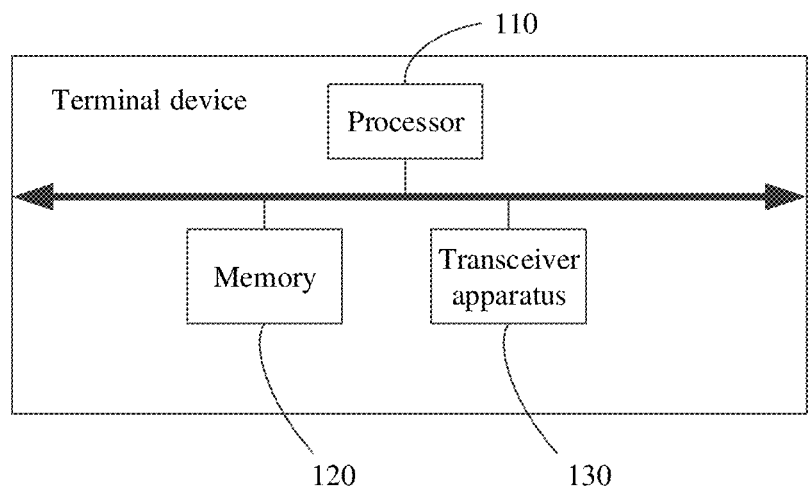
FIG. 12 is a schematic diagram of a structure of a terminal device according to some embodiments.

FIG. 12 is a schematic diagram of a structure of a terminal device according to some embodiments. As shown in FIG. 12, the terminal device includes a processor 110, a memory 120, and a transceiver apparatus 130. The transceiver apparatus 130 is connected to an antenna. In a downlink direction, the transceiver apparatus 130 receives, through the antenna, information sent by a base station, and sends the information to the processor 110 for processing. In an uplink direction, the processor 110 processes data of a terminal and sends the data to the base station through the transceiver apparatus 130.

The memory 120 is configured to store a program for implementing the foregoing method embodiments or the units in embodiments shown in FIG. 5, FIG. 7, and FIG. 8. The processor 110 invokes the program to perform operations in the foregoing method embodiments, to implement the units shown in FIG. 5, FIG. 7, and FIG. 8.

Alternatively, some or all of the foregoing units are implemented in a form of an integrated circuit that is embedded in a chip of the terminal device, and is separately implemented or is integrated. The foregoing units are configured as one or more integrated circuits for implementing the foregoing method, for example, one or more application specific integrated circuits (application specific integrated circuits, ASICs), one or more microprocessors (digital signal processors, DSPs), or one or more field programmable gate arrays (field programmable gate arrays, FPGAs).

Figure 13:
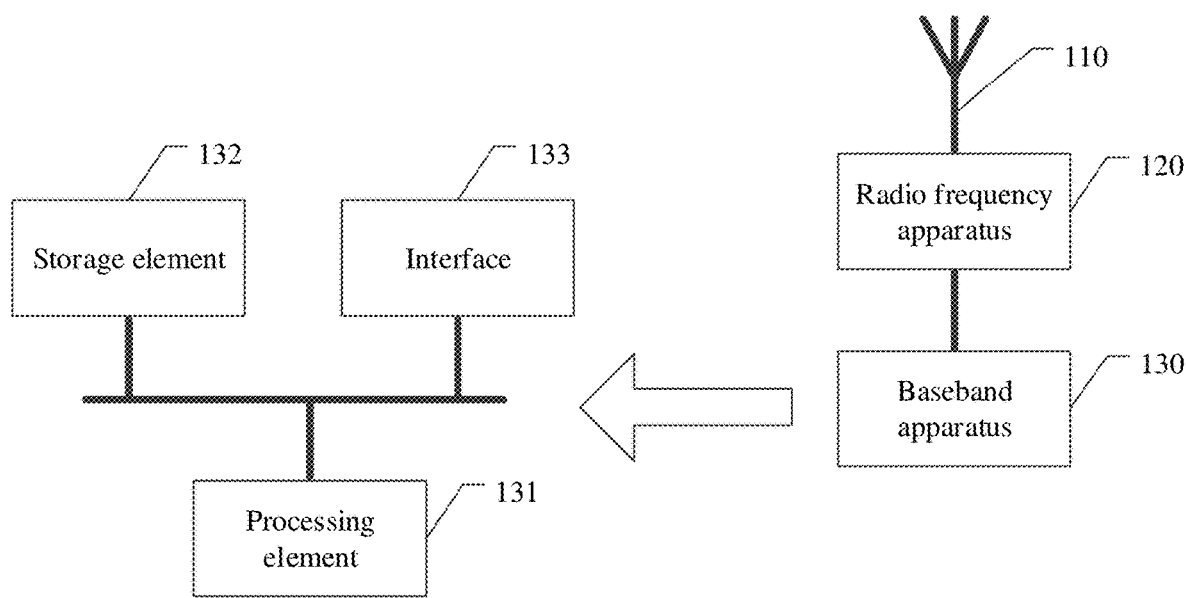
FIG. 13 is a schematic diagram of a structure of a network device according to some embodiments.

FIG. 13 is a schematic diagram of a structure of a network device according to some embodiments. As shown in FIG. 13, the network device includes an antenna 110, a radio frequency apparatus 120, and a baseband apparatus 130. The antenna 110 is connected to the radio frequency apparatus 120. In an uplink direction, the radio frequency apparatus 120 receives, through the antenna 110, information sent by a terminal and sends, to the baseband apparatus 130 for processing, the information sent by a terminal device. In a downlink direction, the baseband apparatus 130 processes the information sent by the terminal device, and sends the information to the radio frequency apparatus 120. The radio frequency apparatus 120 processes the information sent by the terminal device, and then sends the processed information to the terminal device through the antenna 110.

In an implementation, the foregoing units are implemented in a form of a processing element scheduling a program. For example, the baseband apparatus 130 includes a processing element 131 and a storage element 132, and the processing element 131 invokes a program stored in the storage element 132, to perform the method in the foregoing method embodiments. In addition, the baseband apparatus 130 further includes an interface 133, configured to exchange information with the radio frequency apparatus 120. For example, the interface is a common public radio interface (common public radio interface, CPRI).

In some embodiments, the foregoing units are one or more processing elements configured to implement the foregoing method. The processing elements are disposed on the baseband apparatus 130. The processing element herein is an integrated circuit, for example, one or more ASICs, one or more DSPs, or one or more FPGAs. These integrated circuits are integrated to form a chip.

For example, the foregoing modules are integrated, and implemented in a form of a system-on-a-chip (system-on-a-chip, SOC). For example, the baseband apparatus 130 includes a SOC chip, configured to implement the foregoing method. The chip is integrated with the processing element 131 and the storage element 132, and the processing element 131 invokes the program stored in the storage element 132 to implement the foregoing method or functions of the foregoing units. Alternatively, the chip is integrated with at least one integrated circuit, to implement the foregoing method or functions of the foregoing units. Alternatively, the foregoing implementations are combined in a manner that functions of some units are implemented by the processing element invoking a program, and functions of some units are implemented by an integrated circuit.

Regardless of a manner, the network device includes at least one processing element, a storage element, and a communication interface, and the at least one processing element is configured to perform the method provided in the foregoing method embodiments. The processing element performs some or all of the steps in the foregoing method embodiments in a first manner of executing the program stored in the storage element, or in a second manner of combining an integrated logic circuit of hardware in the processing element with instructions. Certainly, the method provided in the foregoing method embodiments are alternatively performed by combining the first manner with the second manner.

The processing element herein is the same as that described above, is a general-purpose processor such as a central processing unit (central processing unit, CPU), or is configured as one or more integrated circuits for implementing the foregoing method, for example, one or more application specific integrated circuits (application specific integrated circuits, ASICs), one or more microprocessors (digital signal processors, DSPs), or one or more field programmable gate arrays (field programmable gate arrays, FPGAs).

The storage element is one memory, or is a general term of a plurality of storage elements.

Some embodiments provide a communication apparatus. The apparatus includes a processor and a memory. The memory stores a computer program. The processor executes the computer program stored in the memory, to enable the apparatus to perform the feedback resource determining method provided in any one of the foregoing embodiments.

Some embodiments provide a communication apparatus, including a processor and an interface circuit.

The interface circuit is configured to receive code instructions and transmit the code instructions to the processor.

The processor is configured to run the code instructions to perform the feedback resource determining method provided in any one of the foregoing embodiments.

Some embodiments provide a communication system, including the terminal device shown in FIG. 11 and the network device shown in FIG. 11.

Some embodiments provide a readable storage medium, configured to store instructions. When the instructions are executed, the feedback resource determining method provided in any one of the foregoing embodiments is implemented.

Some embodiments provide a program product. The program product includes computer programs (namely, executable instructions). The computer programs are stored in a readable storage medium. At least one processor of a first terminal device reads the computer programs from the readable storage medium, and the at least one processor executes the computer programs, so that the first terminal device implements the feedback resource determining method provided in the foregoing implementations.

In some embodiments, a communication apparatus, including at least one storage element and at least one processing element. The at least one storage element is configured to store a program. When the program is executed, the communication apparatus is enabled to perform an operation of the first terminal device in any one of the foregoing embodiments.

Some embodiments provide a readable storage medium, configured to store instructions. When the instructions are executed, the feedback resource determining method provided in any one of the foregoing embodiments is implemented.

Some embodiments provide a program product. The program product includes computer programs (namely, executable instructions). The computer programs are stored in a readable storage medium. At least one processor of a second terminal device reads the computer programs from the readable storage medium, and the at least one processor executes the computer programs, so that the second terminal device implements the feedback resource determining method provided in the foregoing implementations.

In some embodiments, a communication apparatus, including at least one storage element and at least one processing element. The at least one storage element is configured to store a program. When the program is executed, the communication apparatus is enabled to perform an operation of the second terminal device in any one of the foregoing embodiments.

Some embodiments provide a readable storage medium, configured to store instructions. When the instructions are executed, the feedback resource determining method provided in any one of the foregoing embodiments is implemented.

Some embodiments provide a program product. The program product includes computer programs (namely, executable instructions). The computer programs are stored in a readable storage medium. At least one processor of a network device reads the computer programs from the readable storage medium, and the at least one processor executes the computer programs, so that the network device implements the feedback resource determining method provided in the foregoing implementations.

In some embodiments, a communication apparatus, including at least one storage element and at least one processing element. The at least one storage element is configured to store a program. When the program is executed, the communication apparatus is enabled to perform an operation of the network device in any one of the foregoing embodiments.

All or some of the steps of the foregoing method embodiments are implemented by a program instructing related hardware. The foregoing program is stored in a readable memory. When the program is executed, the steps in the foregoing method embodiments are performed. The memory (storage medium) includes: a read-only memory (English: read-only memory, ROM), a RAM, a flash memory, a hard disk, a solid state disk, a magnetic tape (magnetic tape), a floppy disk (floppy disk), an optical disc (optical disc), and any combination thereof.

What is claimed is:

1. A feedback resource determining method, applied to a first terminal device, comprising:
obtaining a first parameter, wherein the first parameter is associated with a cast type and a hybrid automatic repeat request (HARQ) feedback manner, the cast type includes unicast and multicast, and the HARQ feedback manner corresponds to the cast type, and a value of the first parameter is $1/M_1$, where $M_1$ relates to a quantity of resources for a physical sidelink feedback channel (PSFCH); and
determining the PSFCH based on the first parameter.

2. The method according to claim 1, further comprising: sending the first parameter to a second terminal device.

3. The method according to claim 2, further comprising: receiving the PSFCH sent by the second terminal device.

4. The method according to claim 1, wherein:
the first parameter is further associated with a quantity of bits of a HARQ carried on the PSFCH.

5. The method according to claim 1, wherein:
the HARQ feedback manner includes a first manner and a second manner;
the PSFCH includes a first PSFCH and a second PSFCH;
the first PSFCH is used to transmit HARQ information of unicast information and HARQ information fed back in the first manner; and
the second PSFCH is used to transmit HARQ information fed back in the second manner.

6. The method according to claim 1, wherein $M_1$ is a quantity of frequency domain resources of the PSFCH corresponds to each physical sidelink shared channel (PSSCH).

7. The method of claim 1, wherein determining the PSFCH comprises adjusting a size of a preallocated resource based on the first parameter.

8. A feedback resource determining method, applied to a second terminal device, comprising:
receiving a first parameter from a first terminal device, wherein the first parameter is associated with a cast type and a hybrid automatic repeat request (HARQ) feedback manner, the cast type includes unicast and multicast, and the HARQ feedback manner corresponds to the cast type, and a value of the first parameter is $1/M_1$, where $M_1$ relates to a quantity of resources for a physical sidelink feedback channel (PSFCH); and
determining the PSFCH based on the first parameter.

9. The method according to claim 8, further comprising: sending the PSFCH to the first terminal device.

10. The method according to claim 8, wherein:
the first parameter is further associated with a quantity of bits of a HARQ carried on the PSFCH.

11. The method according to claim 8, wherein:
the HARQ feedback manner includes a first manner and a second manner;
the PSFCH includes a first PSFCH and a second PSFCH;
the first PSFCH is used to transmit HARQ information of unicast information and HARQ information fed back in the first manner; and
the second PSFCH is used to transmit HARQ information fed back in the second manner.

12. A feedback resource determining apparatus, comprises:
one or more processors, and
a storage medium configured to store instructions;
wherein, when executed by the one or more processors, the instructions cause the one or more processors to perform operations to:
obtain a first parameter, wherein the first parameter is associated with a cast type and a hybrid automatic repeat request (HARQ) feedback manner, the cast type includes unicast and multicast, and the HARQ feedback manner corresponds to the cast type, and a value of the first parameter is $1/M_1$, where $M_1$ relates to a quantity of resources for a physical sidelink feedback channel (PSFCH); and
determine the PSFCH based on the first parameter.

13. The apparatus according to claim 12, wherein the instructions further cause the one or more processors to perform operations to:
send the first parameter to a second terminal device.

14. The apparatus according to claim 13, wherein the instructions further cause the one or more processors to perform operations to:
receive the PSFCH from the second terminal device.

15. The apparatus according to claim 12, wherein:
the first parameter is further associated with a quantity of bits of a HARQ carried on the PSFCH.

16. The apparatus according to claim 12, wherein:
the HARQ feedback manner includes a first manner and a second manner;
the PSFCH includes a first PSFCH and a second PSFCH;
the first PSFCH is used to transmit HARQ information of unicast information and HARQ information fed back in the first manner; and
the second PSFCH is used to transmit HARQ information fed back in the second manner.

17. A resource determining apparatus, comprises:
one or more processors, and
a storage medium configured to store instructions;
wherein, when executed by the one or more processors, the instructions cause the one or more processors to perform operations to:
receive a first parameter from a first terminal device, wherein the first parameter is associated with a cast type and a hybrid automatic repeat request HARQ feedback manner, the cast type includes unicast and multicast, and the HARQ feedback manner corresponds to the cast type, and a value of the first parameter is $1/M_1$, where $M_1$ relates to a quantity of resources for a physical sidelink feedback channel (PSFCH); and
determine the PSFCH based on the first parameter.

18. The apparatus according to claim 17, wherein the instructions further cause the one or more processors to perform operations to:
send the PSFCH to the first terminal device.

19. The apparatus according to claim 15, wherein:
the first parameter is further associated with a quantity of bits of a HARQ carried on the PSFCH.

20. The apparatus according to claim 17, wherein:
the HARQ feedback manner includes a first manner and a second manner;
the PSFCH includes a first PSFCH and a second PSFCH;
the first PSFCH is used to transmit HARQ information of unicast information and HARQ information fed back in the first manner; and
the second PSFCH is used to transmit HARQ information fed back in the second manner.

* * * * *